United States Patent
Tu et al.

(10) Patent No.: US 12,488,233 B2
(45) Date of Patent: Dec. 2, 2025

(54) NEURAL NETWORK TRAINING METHOD AND APPARATUS, COMPUTER DEVICE, AND STORAGE MEDIUM

(71) Applicant: TENCENT TECHNOLOGY (SHENZHEN) COMPANY LIMITED, Guangdong (CN)

(72) Inventors: Zhao Peng Tu, Shenzhen (CN); Jian Li, Shenzhen (CN); Bao Song Yang, Shenzhen (CN); Tong Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1303 days.

(21) Appl. No.: 17/071,078

(22) Filed: Oct. 15, 2020

(65) Prior Publication Data

US 2021/0027165 A1 Jan. 28, 2021

Related U.S. Application Data

(63) Continuation of application No. PCT/CN2019/103338, filed on Aug. 29, 2019.

(30) Foreign Application Priority Data

Sep. 5, 2018 (CN) .......................... 201811032787.4

(51) Int. Cl.
*G06N 3/08* (2023.01)
*G06N 3/045* (2023.01)

(52) U.S. Cl.
CPC ............... *G06N 3/08* (2013.01); *G06N 3/045* (2023.01)

(58) Field of Classification Search
CPC .......... G06N 3/044; G06N 3/045; G06N 3/08; G06N 3/00; G06N 5/00; G06N 7/00; G06N 10/00; G06N 20/00; G06N 99/00
See application file for complete search history.

(56) References Cited

U.S. PATENT DOCUMENTS

| | | | |
|---|---|---|---|
| 2018/0240013 A1 | 8/2018 | Strope et al. | |
| 2019/0188295 A1* | 6/2019 | Sirotkovic | G06N 3/084 |

FOREIGN PATENT DOCUMENTS

| | | | |
|---|---|---|---|
| CN | 107092596 A | 8/2017 | |
| CN | 107391501 A | 11/2017 | |

(Continued)

OTHER PUBLICATIONS

"End-to-End Comparative Attention Networks for Person Re-Identification" Hao Liu, Jiashi Feng, Meibin Qi, Jianguo Jiang, and Shuicheng Yan, Fellow, IEEE IEEE Transactions on Image Processing, vol. 26, No. 7, Jul. 2017 (Year: 2017).*

(Continued)

*Primary Examiner* — Luis A Sitiriche
(74) *Attorney, Agent, or Firm* — Sughrue Mion, PLLC

(57) ABSTRACT

A neural network training method, apparatus, a storage medium, and a computer device are provided. The method includes: obtaining a training sample set, each training sample including a standard label; inputting the each training sample into a neural network model including n attention networks, the n attention networks respectively mapping the each training sample to n subspaces, each of the n subspaces including a query vector sequence, a key vector sequence, and a value vector sequence; calculating a space difference degree between the n subspaces by using the neural network model; calculating an output similarity degree according to an output of the neural network model and the standard label corresponding to the each training sample; and adjusting a model parameter of the neural network model according to (Continued)

the space difference degree and the output similarity degree until a convergence condition is satisfied to obtain a target neural network model.

20 Claims, 10 Drawing Sheets

(56) References Cited

FOREIGN PATENT DOCUMENTS

| | | |
|---|---|---|
| CN | 108460028 A | 8/2018 |
| CN | 109146064 A | 1/2019 |

OTHER PUBLICATIONS

Written Opinion dated Nov. 27, 2019 issued by the International Searching Authority in Application No. PCT/CN2019/103338.
Rui Wang et al., "Instance Weighting for Neural Machine Translation Domain Adaption", Proceeding of the 2017 Conference on Empirical Methods in Natural Language Processing, Dec. 31, 2017, pp. 1482-1488.
Cai Zilong et al., "Data Augmentation for Neural Machine Translation", Journal of Chinese Information Processing, Jul. 31, 2018, pp. 30-36, vol. 32, No. 7.
International Search Report for PCT/CN2019/103338, dated Nov. 27, 2019.

\* cited by examiner

NEURAL NETWORK TRAINING METHOD AND APPARATUS, COMPUTER DEVICE, AND STORAGE MEDIUM

CROSS-REFERENCE TO RELATED APPLICATION(S)

This application is a continuation of PCT/CN2019/103338, filed on Aug. 29, 2019 and claims priority to Chinese Patent Application No. 201811032787.4, entitled "NEURAL NETWORK TRAINING METHOD AND APPARATUS, AND COMPUTER DEVICE, AND STORAGE MEDIUM," filed with the China National Intellectual Property Administration on Sep. 5, 2018, the disclosures of which are incorporated by reference herein in their entireties.

FIELD

Embodiments of the disclosure relate to the field of computer technologies, and in particular, to a neural network training method and apparatus, a computer device, and a storage medium.

BACKGROUND

An attention mechanism is a method in which a model is established based on a dependency between hidden states of an encoder and a decoder in a neural network, and is widely applied in tasks of natural language processing (NLP) based on deep learning.

Currently, an attention network in a neural network model based on the attention mechanism has a relatively poor capability to capture feature information, causing low accuracy of an output result of the neural network model based on the attention mechanism.

SUMMARY

Embodiments of the disclosure provide a neural network training method and apparatus, a computer device, and a storage medium, which increase a difference between attention networks in a neural network model to improve accuracy of an output result of the neural network model.

According to an embodiment, there is provided a neural network training method, performed by a computer device, the method includes: obtaining a training sample set, each training sample in the training sample set including a corresponding standard label; inputting the each training sample in the training sample set into a neural network model, the neural network model including n attention networks, the n attention networks respectively mapping the each training sample to n different subspaces, each subspace of the n subspaces including a corresponding query vector sequence, a corresponding key vector sequence, and a corresponding value vector sequence, and n being an integer greater than 1; calculating a space difference degree between the n subspaces by using the neural network model; calculating an output similarity degree according to an output of the neural network model and the standard label corresponding to the each training sample; and adjusting a model parameter of the neural network model according to the space difference degree and the output similarity degree until a convergence condition is satisfied, to obtain a target neural network model.

According to an embodiment, there is provided a neural network training apparatus, including: at least one memory configured to store computer program code; and at least one processor configured to access the at least one memory and operate as instructed by the computer program code. The computer program code includes: training sample set obtaining code configured to cause the at least one processor to obtain a training sample set, each training sample in the training sample set including a corresponding standard label; training sample set training code configured to cause the at least one processor to input the each training sample in the training sample set into a neural network model, the neural network model comprising n attention networks, the n attention networks respectively mapping the each training sample to n different subspaces, each subspace of the n subspaces comprising a corresponding query vector sequence, a corresponding key vector sequence, and a corresponding value vector sequence, and n being an integer greater than 1; space difference degree calculation code configured to cause the at least one processor to calculate a space difference degree between the n subspaces by using the neural network model; output similarity degree calculation code configured to cause the at least one processor to calculate an output similarity degree according to an output of the neural network model and the standard label corresponding to the each training sample; and target neural network model generation code configured to cause the at least one processor to adjust a model parameter of the neural network model according to the space difference degree and the output similarity degree until a convergence condition is satisfied, to obtain a target neural network model.

According to an embodiment, there is provided a non-transitory computer-readable storage medium storing computer program code to cause at least one processor to: obtain a training sample set, each training sample in the training sample set including a corresponding standard label; input the each training sample in the training sample set into a neural network model, the neural network model comprising n attention networks, the n attention networks respectively mapping the each training sample to n different subspaces, each subspace of the n subspaces comprising a corresponding query vector sequence, a corresponding key vector sequence, and a corresponding value vector sequence, and n being an integer greater than 1; calculate a space difference degree between the n subspaces by using the neural network model; calculate an output similarity degree according to an output of the neural network model and the standard label corresponding to the each training sample; and adjust a model parameter of the neural network model according to the space difference degree and the output similarity degree until a convergence condition is satisfied, to obtain a target neural network model.

DESCRIPTION

Artificial intelligence (AI) is a theory, method, technology, and application system in which a digital computer or a machine controlled by a digital computer is used to simulate, extend, and expand human intelligence, sense an environment, acquire knowledge, and use the knowledge to obtain an optimal result. In other words, AI is an integrative technology of computer science. AI intends to comprehend the essence of intelligence and produce a new and intelligent machine that can react in a manner similar to human intelligence. AI is to research on design principles and implementations of intelligent machines to enable the machines to have functions of sensing, deducing, and decision-making.

AI technologies are an integrative curriculum, and relate to a wide range of fields, which include both hardware technologies and software technologies. Basic AI technologies generally include technologies such as a sensor, a dedicated AI chip, cloud computing, distributed storage, a big data processing technology, an operation/interaction system, and mechatronics. AI software technologies mainly include several directions such as computer vision technologies, voice processing technologies, NLP technologies, and machine learning (ML)/deep learning.

ML is interdisciplinary, and relates to a plurality of disciplines such as probability, statistics, the approximation theory, convex analysis, and the algorithm complexity theory. ML specializes in how a computer simulates or implements learning behaviors of human, to acquire new knowledge or skills and restructure existing knowledge, so as to keep improving its performance. ML is the core of AI, and is a fundamental way to make a computer intelligent. ML is widely applied in a variety of fields of AI. ML and deep learning usually include technologies such as an artificial neural network, a belief network, reinforcement learning, transfer learning, inductive learning, and imitation learning.

The solutions provided in embodiments of the disclosure relate to ML technologies of AI, and are specifically described by using the following embodiments.

To make the objectives, technical solutions, and advantages of the disclosure clearer and more comprehensible, the embodiments of the disclosure are further described in detail with reference to the accompanying drawings. It is to be understood that the specific embodiments described herein are merely used for explaining some of the embodiments, and are not intended to limit the scope of the disclosure.

Figure 1:
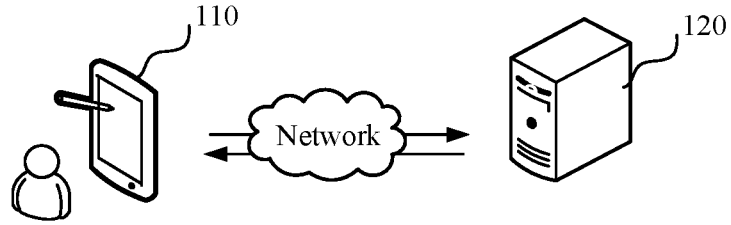
FIG. 1 is a diagram of an application environment of a neural training network according to an embodiment.

FIG. 1 is a diagram of an application environment of a neural network training method according to an embodiment. Referring to FIG. 1, the neural network training method is applied to a neural network training system. The neural network training system includes a terminal 110 and a server 120. The terminal 110 is connected to the server 120 by using a network. The terminal 110 may be specifically a desktop terminal or a mobile terminal. The mobile terminal may be specifically at least one of a mobile phone, a tablet computer, a notebook computer, and the like. The server 120 may be implemented by an independent server or a server cluster including a plurality of servers.

In an embodiment, the terminal 110 or the server 120 obtains a training sample set, each training sample in the training sample set having a corresponding standard label and inputs the each training sample in the training sample set into a neural network model. The neural network model includes a plurality of attention networks, the plurality of attention networks respectively mapping the each training sample to a plurality of different subspaces, each of the subspaces including a corresponding query vector sequence, a corresponding key vector sequence, and a corresponding value vector sequence. The terminal 110 or the server 120 calculates a space difference degree between the subspaces by using the neural network model; calculates an output similarity degree according to an output of the neural network model and the standard label corresponding to the each training sample; and adjusts a model parameter of the neural network model according to the space difference degree and the output similarity degree until a convergence condition is met to obtain a target neural network model.

In another embodiment, the terminal 110 obtains a training sample set, each training sample in the training sample set having a corresponding standard label; and sends the obtained training sample set to the server 120. The server 120 inputs the each training sample in the training sample set into a neural network model, the neural network model including a plurality of attention networks, the plurality of attention networks respectively mapping the each training sample to a plurality of different subspaces, each of the subspaces including a corresponding query vector sequence, a corresponding key vector sequence, and a corresponding value vector sequence; calculates a space difference degree between the subspaces by using the neural network model; calculates an output similarity degree according to an output of the neural network model and the standard label corresponding to the each training sample; adjusts a model parameter of the neural network model according to the space difference degree and the output similarity degree until a convergence condition is met, to obtain a target neural network model; and finally sends the target neural network model to the terminal 110.

Figure 2:
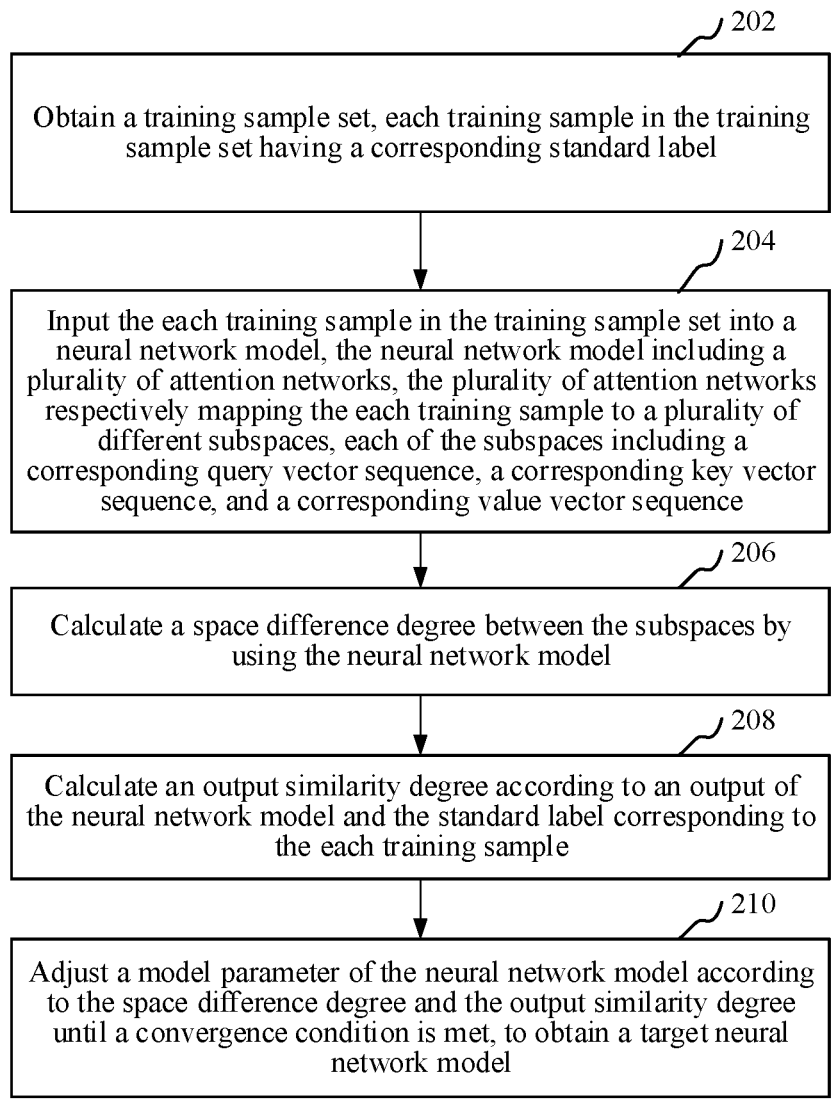
FIG. 2 is a schematic flowchart of a neural network training method according to an embodiment.

FIG. 2 is a schematic flowchart of a neural network training method according to an embodiment. As shown in FIG. 2, in an embodiment, a neural network training method is provided. This embodiment is described mainly by using an example in which the method is applied to the terminal 110 or the server 120 in FIG. 1. Referring to FIG. 2, the neural network training method specifically includes the following steps:

Step 202: Obtain a training sample set, each training sample in the training sample set having a corresponding standard label.

The training sample set includes a plurality of training samples. The training samples are samples used for training a neural network model, and include, but are not limited to, to-be-translated texts, videos, audios, and the like. The standard label corresponding to the each training sample refers to a correct text corresponding to the each training sample. The training sample may include a group of sequentially arranged elements. A training sample including I elements is used as an example. The training sample may be represented by using $X=\{x_1, x_2, x_3, \ldots, x_I\}$, and a length of the training sample is I.

In an embodiment, in a scenario in which a training sample needs to be translated, the training sample may be a word sequence corresponding to a to-be-translated text, elements in the training sample are words in the word sequence, and a standard label refers to a correct text corresponding to the to-be-translated text. If the to-be-translated text is a Chinese text, the word sequence may be a sequence formed by arranging, in a word order, words obtained after word segmentation is performed on the to-be-translated text. For example, the to-be-translated text is "今天是星期一", a corresponding training sample X is {今, 天, 是, 星, 期, 一}, and a standard label corresponding to the to-be-translated text "今天是星期一" is "Today is Monday". If the to-be-translated text is an English text, the word sequence is a sequence formed by arranging words in a word order. For example, the to-be-translated text is "I have an apple", a corresponding training sample X is {I, have, an, apple}, and a standard label corresponding the to-be-translated text "I have an apple" is "我有一个苹果".

Step 204: Input the each training sample in the training sample set into a neural network model, the neural network model including a plurality of attention networks, the plurality of attention networks respectively mapping the each training sample to a plurality of different subspaces, each of the subspaces including a corresponding query vector sequence, a corresponding key vector sequence, and a corresponding value vector sequence.

The training sample in the training sample set is used for training the neural network model. The neural network model may be a recurrent neural network (RNN) model, a neural machine translation (NMT) model, a neural network model of an encoder-decoder structure, or the like. The neural network model includes a plurality of attention networks, which are networks for capturing different feature information. Each of the attention networks includes a plurality of subspaces, which are spaces for performing attention function operations in parallel. Each of the subspaces outputs a corresponding query vector sequence, a corresponding key vector sequence, and a corresponding value vector sequence. The query vector sequence, the key vector sequence, and the value vector sequence are obtained by the subspace by performing an attention function operation on the training sample. The attention function may be linear transformation, which can map a vector belonging to one vector space to another vector space. A vector space is a set including a plurality of vectors of the same dimension.

Specifically, the training sample in the training sample set is inputted into the neural network model. The neural network model first converts the training sample in the training sample set into a corresponding source vector sequence. The source vector sequence is a sequence including source vector representations corresponding to all elements in the training sample. Each vector representation in the source vector sequence is in a one-to-one correspondence with each element in the training sample. The source vector sequence may be represented by using $Z=\{z_1, z_2, z_3, \ldots, z_I\}$. That the neural network model converts the training sample in the training sample set into a corresponding source vector sequence may specifically be converting the elements in the training sample into corresponding vectors by using a first layer of the neural network model, for example, converting an $i^{th}$ element $x_i$ in the training sample into a d-dimensional column vector, that is, $z_i$; and combining the vectors corresponding to the elements in the training sample to obtain the source vector sequence corresponding to the training sample, that is, a vector sequence including I d-dimensional column vectors.

In an embodiment, after the neural network model converts the training sample in the training sample set into the corresponding source vector sequence, the attention networks in the neural network model may respectively map the source vector sequence to different subspaces directly, and each of the subspaces performs an attention function operation on the source vector sequence to obtain a corresponding query vector sequence, a corresponding key vector sequence, and a corresponding value vector sequence. For example, each of the attention networks includes i subspaces, and each of the subspaces includes three different learnable parameter matrices $W_i^Q$, $W_i^K$, and $W_i^V$ for performing linear transformation on the source vector sequence to obtain a query vector sequence Q, a key vector sequence K, and a value vector sequence V:

$$Q_i = Z_i * W_i^Q \quad (1);$$

$$K_i = Z_i * W_i^K \quad (2); \text{ and}$$

$$V_i = Z_i * W_i^V \quad (3).$$

Then a query vector sequence Q, a key vector sequence K, and a value vector sequence V that are outputted by an $i^{th}$ subspace are respectively $Q_i$, $K_i$, and $V_i$. The training sample $X=\{x_1, x_2, x_3, \ldots, x_I\}$ includes I elements. The elements in the source vector sequence $Z=\{z_1, z_2, z_3, \ldots, z_I\}$ are d-dimensional column vectors, that is, Z is a vector sequence including I d-dimensional column vectors, which may be denoted by a matrix of I×d. The learnable parameter matrices $W_i^Q$, $W_i^K$, and $W_i^V$ are matrices of d×d. The query vector sequence Q, the key vector sequence K, and the value vector sequence V are matrices of I×d.

In another embodiment, after the neural network model converts the training sample in the training sample set into the corresponding source vector sequence, the neural network model first performs linear transformation on the source vector sequence Z by using three different learnable parameter matrices $W^Q$, $W^K$, and $W^V$, to obtain a basic query vector sequence q, a basic key vector sequence k, and a basic value vector sequence v:

$$q = Z * W^Q \quad (4);$$

$$k = Z * W^K \quad (5); \text{ and}$$

$$v = Z * W^V \quad (6).$$

The training sample $X=\{x_1, x_2, x_3, \ldots, x_I\}$ includes I elements. The elements in the source vector sequence $Z=\{z_1, z_2, z_3, \ldots, z_I\}$ are d-dimensional column vectors, that is, Z is a vector sequence including I d-dimensional column vectors, which may be denoted by a matrix of I×d. The learnable parameter matrices $W^Q$, $W^K$, and $W^V$ are matrices of d×d. The basic query vector sequence q, the basic key vector sequence k, and the basic value vector sequence v are matrices of I×d.

Then each attention network in the neural network model respectively maps the basic query vector sequence q, the basic key vector sequence k, and the basic value vector sequence v to the subspaces, and each of the subspaces performs an attention function operation on the basic query vector sequence q, the basic key vector sequence k, and the basic value vector sequence v to obtain a corresponding query vector sequence Q, a corresponding key vector sequence K, and a corresponding value vector sequence V:

$$Q_i = q * W_i^Q \quad (7);$$

$$K_i = k * W_i^K \quad (8); \text{ and}$$

$$V_i = v * W_i^V \quad (9).$$

Then a query vector sequence Q, a key vector sequence K, and a value vector sequence V that are outputted by an $i^{th}$ subspace are respectively $Q_i$, $K_i$, and $V_i$. Learnable parameter matrices $W_i^Q$, $W_i^K$, and $W_i^V$ of each of the subspaces are different from those of other subspaces.

Step 206: Calculate a space difference degree between the subspaces by using the neural network model.

The space difference degree is used for measuring a difference between the subspaces. When calculating the difference degree between the subspaces, the neural network model may calculate a subspace input difference degree based on value vector sequences corresponding to adjacent subspaces, calculate an attention matrix difference degree based on query vector sequences and value vector sequences that correspond to adjacent subspaces, or calculate a subspace output difference degree based on output vector sequences of adjacent subspaces, or the like. The neural network model then determines the space difference degree between the subspaces according to the subspace input difference degree, the attention matrix difference degree, and the subspace output difference degree. At least one of the subspace input difference degree, the attention matrix difference degree, or the subspace output difference degree may be determined as the space difference degree between the subspaces, or two of the subspace input difference degree, the attention matrix difference degree, and the subspace output difference degree may be combined and a combination result may be determined as the space difference degree between the subspaces.

In an embodiment, calculating the space difference degree between the subspaces by using the neural network model may include calculating the attention matrix difference degree based on the query vector sequences and the value vector sequences that correspond to the adjacent subspaces, which may specifically be that the neural network model first calculates similarity degrees between the query vector sequences and the value vector sequences according to the query vector sequences and the value vector sequences of the subspaces, then calculates attention matrices of the subspaces according to the similarity degrees between the query vector sequences and the value vector sequences, and finally calculates the attention matrix difference degree according to the attention matrices corresponding to the adjacent subspaces.

In an embodiment, calculating the space difference degree between the subspaces by using the neural network model my include calculating the subspace input difference degree based on the value vector sequences corresponding to the adjacent subspaces, which may specifically be calculating similarity degrees between the value vector sequences corresponding to the adjacent subspaces, and calculating the subspace input difference degree according to the similarity degrees between the value vector sequences corresponding to the adjacent subspaces.

In an embodiment, the calculating the space difference degree between the subspaces by using the neural network model may include calculating the subspace output difference degree based on the output vector sequences of the adjacent subspaces, which may specifically be calculating similarity degrees between the output vector sequences of the adjacent subspaces, and calculating the subspace output difference degree according to the similarity degrees between the output vector sequences corresponding to the adjacent subspaces.

Step 208: Calculate an output similarity degree according to an output of the neural network model and the standard label corresponding to the each training sample.

The output similarity degree is used for measuring a similarity between the outputs of the neural network model and the standard label corresponding to the training sample. When the training sample in the training sample set is inputted into the neural network model, the neural network model outputs a corresponding output label. The output label outputted by the neural network model is compared with the standard label corresponding to the training sample to obtain the output similarity degree. Specifically, the output similarity degree may be calculated by calculating a cosine distance between the output label outputted by the neural network model and the standard label corresponding to the training sample, and using the cosine distance as the output similarity degree; or calculating a Euclidean distance between the output label outputted by the neural network model and the standard label corresponding to the training sample, and using a calculation result as the output similarity degree. A higher output similarity degree indicates that the output label outputted by the neural network model is more similar to the standard label corresponding to the training sample, and indicates that an output result of the neural network model is more accurate.

Step 210: Adjust a model parameter of the neural network model according to the space difference degree and the output similarity degree until a convergence condition is satisfied to obtain a target neural network model.

After the space difference degree and the output similarity degree are calculated, the model parameter of the neural network model is adjusted according to the space difference degree and the output similarity degree. Subsequently, an adjusted neural network model is further trained by repeating the foregoing steps until the convergence condition is met to obtain the target neural network model. The target neural network model is a well-trained neural network model. The convergence condition may be that both the space difference degree and the output similarity degree are maximized; or may be that a model adjustment reference result is obtained through calculation according to the space difference degree and the output similarity degree, and when the model adjustment reference result is maximized, it is considered that the convergence condition is met.

In an embodiment, the space difference degree and the output similarity degree may be used as a target function, and the neural network model is trained according to the target function. When the neural network model meets the convergence condition, it is considered that the target function is maximized and the target neural network model is obtained. The target function may be calculated by using the following formula:

$$J(\theta) = \underset{\theta}{\arg\max}\left\{\underbrace{L(y \mid x; \theta)}_{likelihood} + \lambda * \underbrace{D(a \mid x, y; \theta)}_{disagreement}\right\}. \quad (10)$$

Here, $J(\theta)$ is the target function, likelihood is the output similarity degree, and disagreement is the space difference degree, a is attention matrices in the subspaces, $\lambda$ is a hyper-parameter for balancing the output similarity degree and the space difference degree, which may be set according to an actual application scenario and usually achieves an optimal effect when set to 1.0, x is an input of the neural network model, y is the output of the neural network model, $\theta$ is learnable parameter matrices of the subspaces, and arg max is an arguments of the maxima for obtaining a maximized value.

In the foregoing neural network training method, a training sample set is obtained, each training sample in the training sample set having a corresponding standard label; the each training sample in the training sample set is inputted into a neural network model, the neural network model including a plurality of attention networks, the plurality of attention networks respectively mapping the each training sample to a plurality of different subspaces, each of the subspaces including a corresponding query vector sequence, a corresponding key vector sequence, and a corresponding value vector sequence; a space difference degree between the subspaces is calculated by using the neural network model; an output similarity degree is calculated according to an output of the neural network model and the standard label corresponding to the each training sample; and a model parameter of the neural network model is adjusted according to the space difference degree and the output similarity degree until a convergence condition is satisfied, to obtain a target neural network model. When training the neural network model, the output similarity degree is considered, so that accuracy of an output result of the neural network model is improved; and the space difference degree is also considered to ensure that the plurality of attention networks of the neural network model can capture different features in corresponding subspaces, so as to increase differences between the attention networks in the neural network model, thereby improving the accuracy of the output result of the neural network model.

Figure 3:
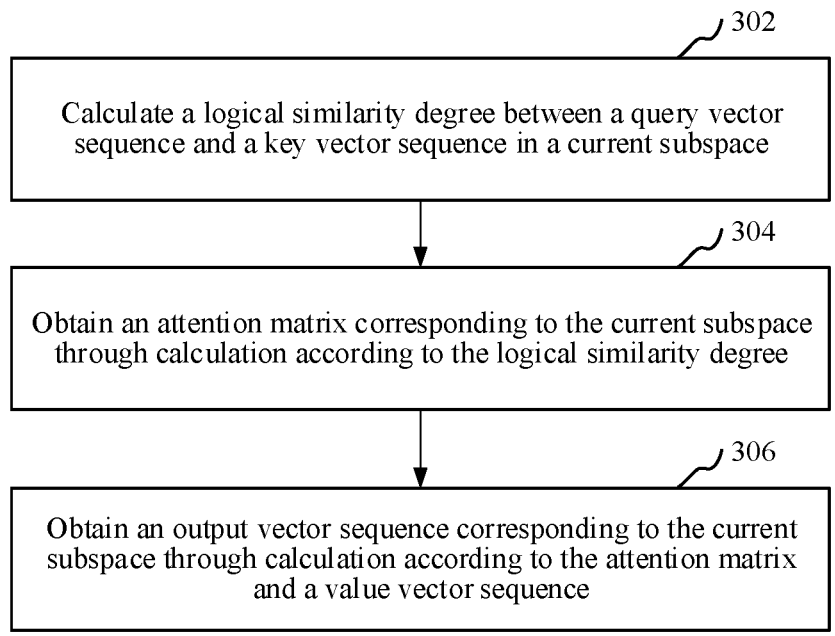
FIG. 3 is a schematic flowchart of a neural network training method according to another embodiment.

FIG. 3 is a schematic flowchart of a neural network training method according to an embodiment. As shown in FIG. 3, the neural network training method further includes the following steps:

Step 302: Calculate a logical similarity degree between a query vector sequence and a key vector sequence in a current subspace.

A query vector sequence of each subspace is a target vector sequence. The logical similarity degree represents a similarity between the target vector sequence and a key vector sequence corresponding to the training sample. A current subspace is one of the subspaces. The calculating of a logical similarity degree between a query vector sequence and a key vector sequence in the current subspace may include calculating the logical similarity degree between the query vector sequence and the key vector sequence in the current subspace by using a cosine similarity formula, or calculating the logical similarity degree between the query vector sequence and the key vector sequence in the current subspace by using a Euclidean distance, or the like.

In an embodiment, a logical similarity degree matrix E between the query vector sequence Q and the key vector sequence K of the current subspace may be calculated by using the cosine similarity formula:

$$E = \frac{Q \cdot K^T}{\sqrt{d}} \quad (11)$$

$K^T$ represents a transposed matrix of the key vector sequence K. d is a dimension of a source vector representation $z_i$ converted from each element $x_i$ in the training sample. d is also a dimension represented by a network corresponding to $x_i$, and a dimension of a hidden state vector of the network. In the formula, a divisor $\sqrt{d}$ is to reduce an inner product to increase the calculation speed.

A calculation process of the logical similarity degree matrix E is described below through specific calculation: $Q=(q_1, q_2, \ldots, q_i, \ldots, q_I)$ and $K=(k_1, k_2, \ldots, k_i, \ldots, k_I)$. $q_i$ and $k_i$ are d-dimensional column vectors, and are respectively a query vector and a key vector that correspond to the source vector representation $z_i$. In the logical similarity degree matrix $E=(e_1, e_2, \ldots, e_i, \ldots, e_I)$, the element $e_i$ is logical similarity degrees between the query vector $q_i$ corresponding to the source vector representation $z_i$ and key vectors $k_1, k_2, \ldots, k_i, \ldots, k_I$ corresponding to all the elements in the training sample. $e_i$ is an element in an $i^{th}$ column of E, $e_i$ is an I-dimensional column vector, and a calculation formula is $$e_i = \frac{1}{\sqrt{d}}(q_i \cdot k_1^T, q_i \cdot k_2^T, q_i \cdot k_3^T, \ldots, q_i \cdot k_I^T).$$

Substantially, $e_i$ implicitly includes a relationship between an $i^{th}$ element $x_i$ and two elements in I groups of elements including all the elements $x_1, x_2, \ldots, x_i, \ldots, x_I$ in the training sample. The logical similarity degree matrix E is a matrix of I×I, and the logical similarity degree matrix E is:

$$E = \frac{1}{\sqrt{d}}\begin{Bmatrix} q_1 \cdot k_1^T & q_2 \cdot k_1^T & q_3 \cdot k_1^T & \ldots & q_I \cdot k_1^T \\ q_1 \cdot k_2^T & q_2 \cdot k_2^T & q_3 \cdot k_2^T & \ldots & q_I \cdot k_2^T \\ q_1 \cdot k_3^T & q_2 \cdot k_3^T & q_3 \cdot k_3^T & \ldots & q_I \cdot k_3^T \\ \ldots & \ldots & \ldots & \ldots & \ldots \\ q_1 \cdot k_I^T & q_2 \cdot k_I^T & q_3 \cdot k_I^T & \ldots & q_I \cdot k_I^T \end{Bmatrix}. \quad (12)$$

Step 304: Obtain an attention matrix corresponding to the current subspace through calculation according to the logical similarity degree.

Because the logical similarity degree represents a similarity between the query vector sequence corresponding to the training sample and the key vector sequence corresponding to the training sample, an attention matrix corresponding to each subspace may be obtained through calculation according to the logical similarity degree. The attention matrix is used for converting into a weight relationship between the query vector sequence and each key vector sequence and value vector sequence according to the logical similarity degree. Specifically, after logical similarity degrees corresponding to the subspaces are obtained, the logical similarity degrees corresponding to the subspaces are normalized, and the attention matrix corresponding to the current subspace is finally obtained.

In an embodiment, an attention matrix A corresponding to each subspace may be obtained through calculation by using the following formula:

$$A_i = \text{softmax}(E_i).$$

An attention matrix of an $i^{th}$ subspace is $A_i$. The softmax function is a normalization function. $A_i$ is the attention matrix corresponding to the $i^{th}$ subspace. $E_i$ is a logical similarity degree corresponding to the $i^{th}$ subspace.

Step 306: Obtain an output vector sequence corresponding to the current subspace through calculation according to the attention matrix and a value vector sequence.

Specifically, after logical similarity degrees and attention matrices are obtained, output vector sequences corresponding to the subspaces are obtained through calculation according to value vector sequences and the attention matrices. The current subspace is one of the subspaces. That output vector sequences corresponding to the subspaces are obtained through calculation according to value vector sequences and the attention matrices may be fusing the value vector sequences and the attention matrices that correspond to the subspaces, to obtain the output vector sequences corresponding to the subspaces. The fusing the value vector sequences and the attention matrices that correspond to the subspaces may specifically be: using an attention matrix of each of the subspace as a weight coefficient of a value vector sequence, and performing weighted summation on value vectors in the value vector sequence, to obtain an output vector sequence $O_i$ corresponding to a current element $x_i$. An output vector sequence $x_i$ corresponding to each of the subspaces may be obtained through calculation by using the following formula:

$$O_i = A_i * V_i \tag{13}.$$

An output vector sequence corresponding to an $i^{th}$ subspace is $O_i$. $A_i$ is an attention matrix corresponding to the $i^{th}$ subspace. $V_i$ is a value vector sequence corresponding to the $i^{th}$ subspace.

Figure 4:
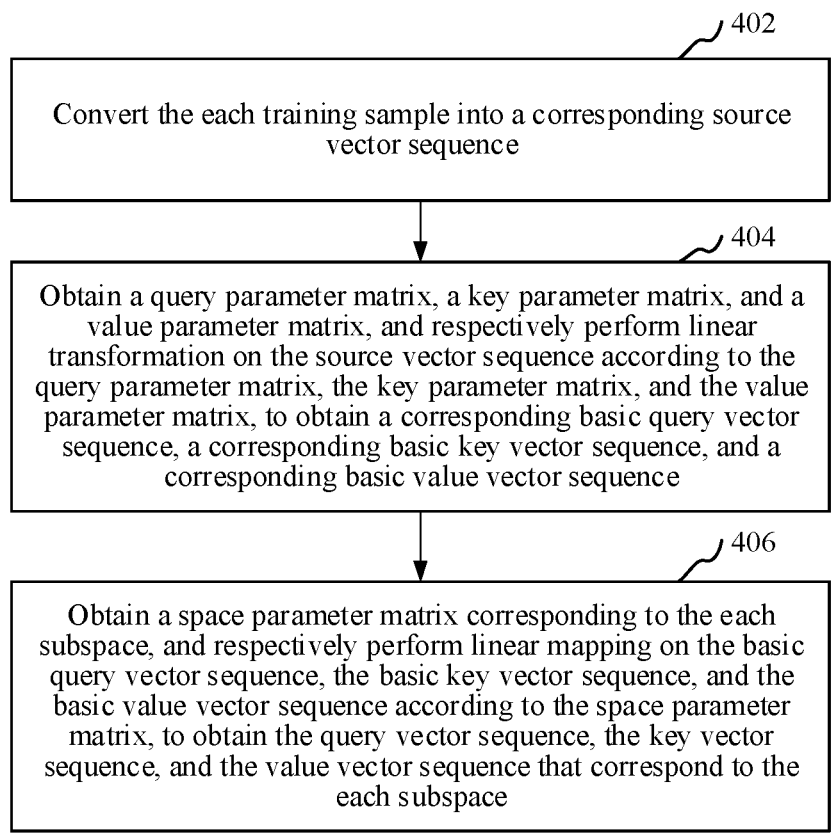
FIG. 4 is a schematic flowchart of a step of respectively mapping, by a plurality of attention networks, a training sample to a plurality of different subspaces according to an embodiment.

FIG. 4 is a schematic flowchart of a step of respectively mapping, by a plurality of attention networks, a training sample to a plurality of different subspaces according to an embodiment. As shown in FIG. 4, the plurality of attention networks respectively mapping the each training sample to a plurality of different subspaces includes the following steps:

Step 402: Convert the each training sample into a corresponding source vector sequence.

Specifically, the training sample is a sequence to be transformed to output a corresponding output vector sequence. The training sample includes a group of sequentially arranged elements. A training sample including I elements is used as an example. The training sample may be represented by using $X = \{x_1, x_2, x_3, \ldots, x_I\}$, and a length of the training sample is I.

In a scenario in which a training sample needs to be translated, the training sample may be a word sequence corresponding to a to-be-translated text, and elements in the training sample are words in the word sequence. If the to-be-translated text is a Chinese text, the word sequence may be a sequence formed by arranging, in a word order, words obtained after word segmentation is performed on the to-be-translated text. If the to-be-translated text is an English text, the word sequence is a sequence formed by arranging words in a word order. For example, if the to-be-translated text is "Bush held a talk with Sharon", a corresponding training sample X is {Bush, held, a, talk, with, Sharon}.

The source vector sequence is a sequence including source vector representations corresponding to all the elements in the training sample. Each vector representation in the source vector sequence is in a one-to-one correspondence with each element in the training sample. The source vector sequence may be represented by using $Z = \{z_1, z_2, z_3, \ldots, z_I\}$.

Specifically, the terminal or the server may convert each element in the training sample into a vector having a fixed length (that is, word embedding). In an embodiment, the terminal or the server may convert the elements in the training sample into corresponding vectors by using a first layer of the neural network model, for example, convert an $i^{th}$ element $x_i$ in the training sample into a d-dimensional column vector, that is, $z_i$; and combine the vectors corresponding to the elements in the training sample to obtain the source vector sequence corresponding to the training sample, that is, a vector sequence including I d-dimensional column vectors. Alternatively, the terminal or the server may receive a source vector sequence that corresponds to the training sample and that is sent by another device. Both $z_i$ and the column vector mentioned below may be row vectors. For ease of describing the calculation process, descriptions are provided using column vectors.

Step 404: Obtain a query parameter matrix, a key parameter matrix, and a value parameter matrix, and respectively perform linear transformation on the source vector sequence according to the query parameter matrix, the key parameter matrix, and the value parameter matrix, to obtain a corresponding basic query vector sequence, a corresponding basic key vector sequence, and a corresponding basic value vector sequence.

The query parameter matrix, the key parameter matrix, and the value parameter matrix are respectively used for converting the source vector sequence into the corresponding basic query vector sequence, the corresponding basic key vector sequence, and the corresponding basic value vector sequence. All of the query parameter matrix, the key parameter matrix, the value parameter matrix are learnable parameter matrices. Specifically, the query parameter matrix, the key parameter matrix, and the value parameter matrix are obtained, and linear transformation is respectively performed on the source vector sequence according to the query parameter matrix, the key parameter matrix, and the value parameter matrix, to obtain the corresponding basic query vector sequence, the corresponding basic key vector sequence, and the corresponding basic value vector sequence. The linear transformation can map a vector belonging to one vector space to another vector space. A vector space is a set including a plurality of vectors of the same dimension. Specifically, the terminal or the server may respectively perform linear transformation on the source vector sequence by using the query parameter matrix, the key parameter matrix, and the value parameter matrix, and respectively map the source vector sequence to three different vector spaces, to obtain the basic query vector sequence, the basic key vector sequence, and the basic value vector sequence that correspond to the source vector sequence.

In an embodiment, three different learnable parameter matrices: a query parameter matrix, a key parameter matrix, and a value parameter matrix are obtained, and linear transformation is performed on a source vector sequence Z by using the query parameter matrix $W^Q$, the key parameter matrix $W^K$, and the value parameter matrix $W^V$, to obtain a basic query vector sequence q, a basic key vector sequence k, and a basic value vector sequence v:

$$q=Z*W^Q;$$

$$k=Z*W^K; \text{ and}$$

$$v=Z*W^V.$$

Step 406: Obtain a space parameter matrix corresponding to the each subspace, and respectively perform linear mapping on the basic query vector sequence, the basic key vector sequence, and the basic value vector sequence according to the space parameter matrix, to obtain the query vector sequence, the key vector sequence, and the value vector sequence that correspond to the each subspace.

The space parameter matrix is used for converting the basic query vector sequence, the basic key vector sequence, and the basic value vector sequence into the query vector sequence, the key vector sequence, and the value vector sequence that correspond to the each subspace. Specifically, after the basic query vector sequence, the basic key vector sequence, and the basic value vector sequence that correspond to the each subspace are obtained, the basic query vector sequence, the basic key vector sequence, and the basic value vector sequence that correspond to the each subspace are respectively mapped to the each subspace according to the space parameter matrix corresponding to the each subspace. To be specific, linear mapping may be respectively performed on the basic query vector sequence, the basic key vector sequence, and the basic value vector sequence according to the space parameter matrix, to obtain the query vector sequence, the key vector sequence, and the value vector sequence that correspond to the each subspace.

In an embodiment, linear mapping is respectively performed on the basic query vector sequence q, the basic key vector sequence k, and the basic value vector sequence v by using the space parameter matrix corresponding to the each subspace, to obtain a query vector sequence Q, a key vector sequence K, and a value vector sequence V that correspond to the each subspace:

$$Q_i=q*W_i^Q;$$

$$K_i=k*W_i^K; \text{ and}$$

$$V_i=v*W_i^V.$$

The training sample $X=\{x_1, x_2, x_3, \ldots, x_I\}$ includes I elements. The elements in the source vector sequence $Z\{z_1, z_2, z_3, \ldots, z_I\}$ are d-dimensional column vectors, that is, Z is a vector sequence including I d-dimensional column vectors, which may be denoted by a matrix of I×d. $W_i^Q$, $W_i^K$, and $W_i^V$ are space parameter matrices of an $i^{th}$ subspace; and $W_i^Q$, $W_i^K$, and $W_i^V$ also are different space parameter matrices. The learnable parameter matrices $W_i^Q$, $W_i^K$, and $W_i^V$ of the $i^{th}$ subspace are matrices of d×d. Then the finally obtained query vector sequence Q, key vector sequence K, and value vector sequence V are matrices of I×d.

Figure 5:
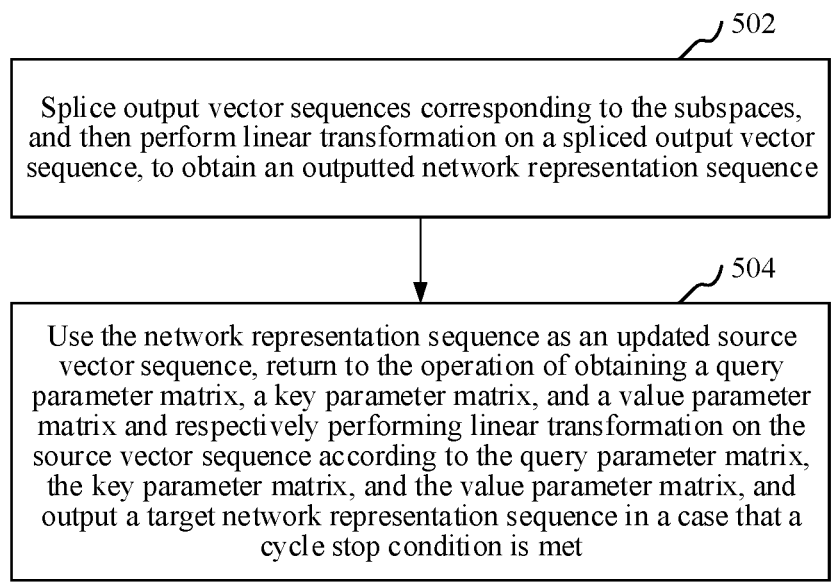
FIG. 5 is a schematic flowchart of a neural network training method according to still another embodiment.

FIG. 5 is a schematic flowchart of a neural network training method according to an embodiment. As shown in FIG. 5, the neural network training method further includes the following steps:

Step 502: Splice output vector sequences corresponding to the subspaces, and perform linear transformation on a spliced output vector sequence to obtain an outputted network representation sequence.

Step 504: Use the network representation sequence as an updated source vector sequence, return to the operation of obtaining a query parameter matrix, a key parameter matrix, and a value parameter matrix and respectively performing linear transformation on the source vector sequence according to the query parameter matrix, the key parameter matrix, and the value parameter matrix, and output a target network representation sequence in a case that a cycle stop condition is met. Here, the cycle stop condition may be a predetermined condition set by a user or a condition that automatically assumes to stop the cycle when the target network representation sequence is output.

Specifically, the source vector sequence corresponding to the training sample may be processed by using a stacked multi-head neural network. The source vector sequence is first segmented to obtain a plurality of low-dimensional source vector subsequences (also referred to as heads). For example, the source vector sequence includes 5 elements, and each of the elements is a 512-dimensional column vector. The source vector sequence is segmented into 8 parts, and 8 source vector sub-sequences of 5×64 are obtained. The 8 source vector sub-sequences are respectively used as input vectors and transformed by the subspaces, to output 8 output vector sequences of 5×64. After the 8 output vector sequences are spliced, linear transformation is performed, to output a 5×512-dimensional network representation sequence.

For example, the stacked multi-head neural network includes H subspaces. First, an input sequence $X=\{x_1, x_2, x_3, \ldots, x_I\}$ is converted into a source vector sequence $Z=\{z_1, z_2, z_3, \ldots, z_I\}$. After $Z=\{z_1, z_2, z_3, \ldots, z_I\}$ is segmented, H source vector sub-sequences are obtained. Subsequently, the source vector subsequences are respectively transformed in the subspaces. A description is made by using an example in which the transformation is performed in an $h^{th}$ (h=1, 2, ..., H) subspace: In the $h^{th}$ subspace, linear transformation is performed on $Z_h=\{z_{h1}, z_{h2}, z_{h3}, \ldots, z_{hI}\}$ by using corresponding learnable parameter matrices $W_h^Q$, $W_h^K$, and $W_h^V$, to obtain a corresponding query vector sequence $Q_h$, a corresponding key vector sequence $K_h$, and a corresponding value vector sequence $V_h$. The three learnable parameter matrices used in each of the H subspaces are different from those used in other subspaces, so that different feature vectors are respectively obtained in the subspaces, thereby paying attention to different local information in different subspaces.

Next, in the $h^{th}$ subspace, a logical similarity degree $E_h$ between the query vector sequence and the key vector sequence is calculated:

$$E_h = \frac{Q_h \cdot K_h^T}{\sqrt{d}}. \tag{14}$$

Subsequently, in the $h^{th}$ subspace, non-linear transformation is performed on the logical similarity degree $E_h$ by using the softmax function to obtain an attention matrix $A_h$ corresponding to the $h^{th}$ subspace: $A_h$=soft max($E_h$) (15). Further, in the $h^{th}$ subspace, an output vector sequence $O_h$ corresponding to the $h^{th}$ subspace is obtained through calculation according to the attention matrix and the value vector sequence. Specifically, the output vector sequence $O_h$ corresponding to the training sample is obtained through calculation by using the formula $O_h=A_h*V_h$. Finally, output vector sequences $O_h$ of the subspaces in the neural network model are spliced, and linear transformation is performed once again to obtain a network representation sequence $O=\text{Concat}(O_1, O_2, O_3, \ldots, O_h, \ldots, O_H)W^O$ (16).

Further, the neural network model may stack a plurality of layers of calculation. Regardless of whether the neural network model is a one-layer neural network model or a stacked multi-head neural network model, calculation can be performed in a repeated manner for a plurality of layers. In a calculation of each layer, an output of an upper layer may be used as an input of a lower layer. The step of performing linear transformation to respectively obtain a corresponding query vector sequence, a corresponding key vector sequence, and a corresponding value vector sequence is repeatedly performed until an output of a current layer, that is, a network representation sequence of the current layer, is obtained. For the considerations of efficiency and performance, the step may be repeated, for example, 6 times, and network parameters of all the layers of neural networks are different. It may be understood that a process of repeating 6 times is actually a process in which the source vector sequence of the original training sample is updated 6 times by using the network parameters of the layers.

For example, in a stacked multi-head neural network, an output of a first layer is $O^{L1}$; in calculation of a second layer, $O^{L1}$ is used as an input, $O^{L1}$ is transformed by using network parameters of the second layer, and an output $O^{L2}$ of the second layer is outputted . . . , until the repetition times is reached. According to the example provided above, an output after 6 repetition times may be used as a final output. That is, $O^{L6}$ is used as the target network representation sequence corresponding to the training sample.

Figure 6:
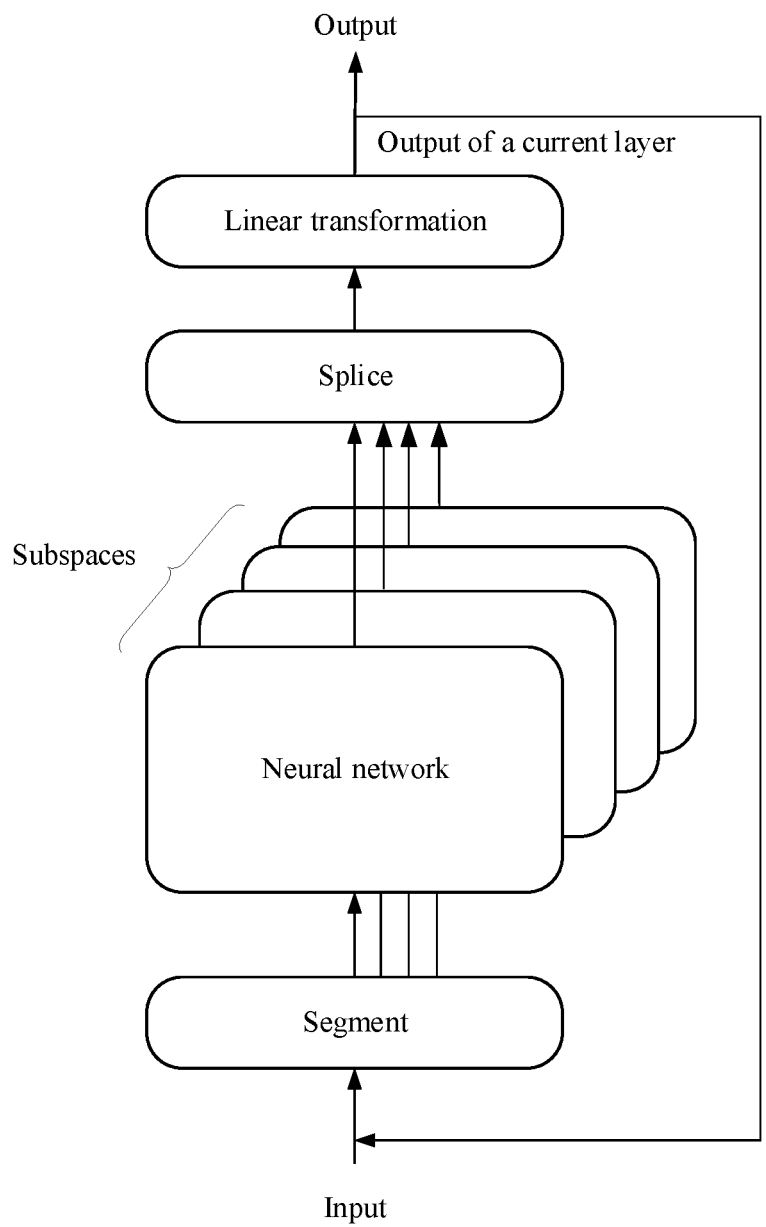
FIG. 6 is a schematic structural diagram of a stacked multi-head neural network with a plurality of layers according to an embodiment.

FIG. 6 is a schematic structural diagram of a stacked multi-head neural network with a plurality of layers according to an embodiment. Referring to FIG. 6, inputs are the same for each layer, and each of the inputs is an output of an upper layer. Subsequently, the input is divided into a plurality of sub-inputs, and the same transformation is performed on the sub-inputs by using respective network parameters of a plurality of subspaces (also referred to as heads), to obtain outputs of all the subspaces. Finally, the plurality of outputs are spliced to obtain an output of a current layer, and the output of the current layer is used as an input of a next layer. The process is repeated a plurality of times, and an output of a last layer is used as a final output.

In an embodiment, the training sample may be a to-be-translated text, and the outputted target network representation sequence is feature vectors corresponding to words in a translated text, so that a translated sentence can be determined according to the outputted target network representation sequence. In the embodiments provided herein, translation quality is significantly improved in translation of relatively long phrases and relatively long sentences.

Figure 7:
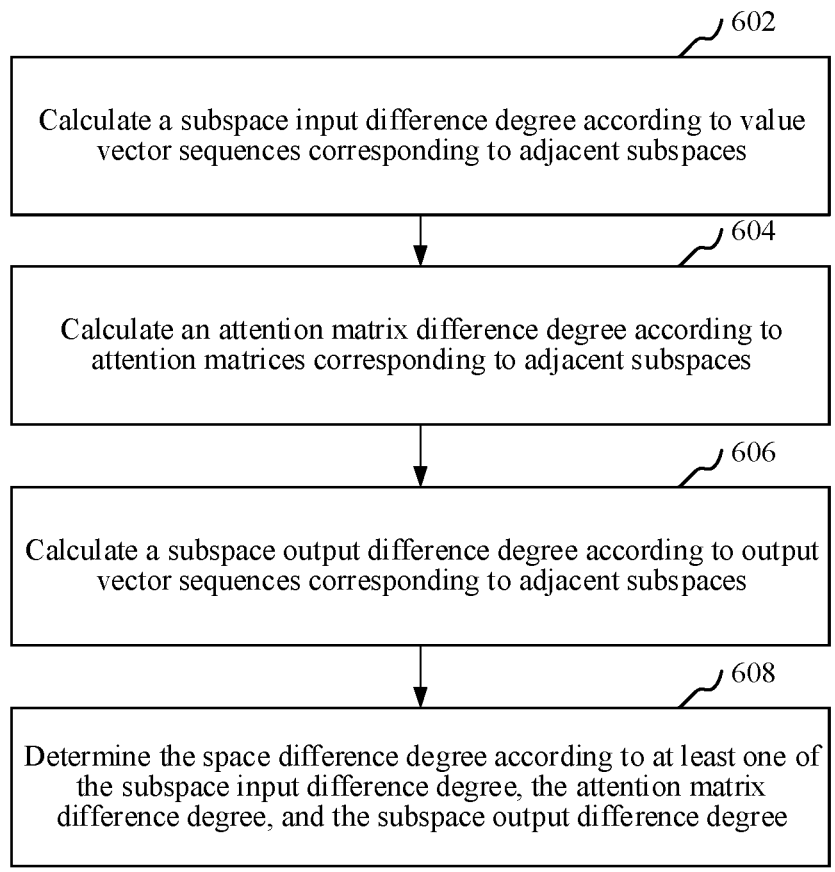
FIG. 7 is a schematic flowchart of a step of calculating a space difference degree between subspaces by using a neural network model according to an embodiment.

FIG. 7 is a schematic flowchart of a step of calculating a space difference degree between subspaces by using a neural network model according to an embodiment. As shown in FIG. 7, the calculating the space difference degree between the subspaces by using the neural network model includes the following steps:

Step 602: Calculate a subspace input difference degree according to value vector sequences corresponding to adjacent subspaces.

The subspace input difference degree is used for measuring a difference degree between all value vector sequences in the subspaces. A difference between the subspaces in the neural network model may be increased by increasing a subspace input difference degree of the neural network model. Because an output of the neural network model is more accurate when the difference between the subspaces in the neural network model is increased, in a text translation application scenario, content of a text translated by the neural network model is more accurate when a difference between subspaces is increased. Specifically, a subspace input difference degree may be calculated according to value vector sequences corresponding to adjacent subspaces. A manner for calculating the subspace input difference degree may be customized. The calculation manner may be customized as: first obtaining the value vector sequences corresponding to the adjacent subspaces of the neural network model, and performing weighted summation on the value vector sequences corresponding to the adjacent subspaces to obtain the subspace input difference degree. Alternatively, normalization and a dot product operation may be first performed on the adjacent subspaces in the neural network model to obtain cosine similarity degrees between the value vector sequences corresponding to the adjacent subspaces, and a sum of the cosine similarity degrees between the value vector sequences corresponding to the adjacent subspaces in the neural network model may be used as the subspace input difference degree. Alternatively, a sum of the value vector sequences corresponding to the adjacent subspaces in the neural network model may be used as the subspace input difference degree, or the like.

Step 604: Calculate an attention matrix difference degree according to attention matrices corresponding to adjacent subspaces.

The attention matrices are obtained through calculation by using logical similarity degrees between the subspaces, and all the subspaces in the neural network model obtain corresponding attention matrices through calculation according to the logical similarity degrees between the subspaces. Therefore, the difference between the subspaces in the neural network model may be increased by increasing the attention matrix difference degree in the neural network model. The attention matrix difference degree is calculated according to the attention matrices corresponding to the adjacent subspaces. A manner of calculating the attention matrix difference degree may be customized. Specifically, the calculation manner may be customized by first obtaining the attention matrices corresponding to the adjacent subspaces of the neural network model, and performing weighted summation on the attention matrices corresponding to the adjacent subspaces to obtain the attention matrix difference degree. Alternatively, similarity degrees between the attention matrices of the adjacent subspaces may be measured by multiplying the attention matrices corresponding to the adjacent subspaces in the neural network model according to an element matrix, and a sum of the similarity degrees between the attention matrices of the adjacent subspaces may be used as the attention matrix difference degree. Alternatively, a sum of the attention matrices corresponding to the adjacent subspaces in the neural network model may be used as the attention matrix difference degree, or the like.

Step 606: Calculate a subspace output difference degree according to output vector sequences corresponding to adjacent subspaces.

The subspace output difference degree is used for measuring difference degrees between all output vector sequences in the subspaces. A difference between the subspaces in the neural network model may specifically be increased by increasing differences between the output vector sequences of the subspaces in the neural network model. A manner for calculating the subspace output difference degree according to the output vector sequences corresponding to the adjacent subspaces may be customized. The calculation manner may be customized as: first obtaining the output vector sequences corresponding to the adjacent subspaces of the neural network model, and then performing weighted summation on the output vector sequences corresponding to the adjacent subspaces to obtain the subspace output difference degree. Alternatively, normalization and a dot product operation are first performed on the adjacent subspaces in the neural network model, to obtain cosine similarity degrees between the output vector sequences corresponding to the adjacent subspaces, and then a sum of the cosine similarity degrees between the output vector sequences corresponding to the adjacent subspaces in the neural network model is used as the subspace output difference degree. Alternatively, a sum of the output vector sequences corresponding to the adjacent subspaces in the neural network model is used as the subspace output difference degree, or the like.

Step 608: Determine the space difference degree according to at least one of the subspace input difference degree, the attention matrix difference degree, and the subspace output difference degree.

Specifically, after the subspace input difference degree, the attention matrix difference degree, and the subspace output difference degree are calculated, because all of the subspace input difference degree, the attention matrix difference degree, and the subspace output difference degree can increase the difference between the subspaces in the neural network model, the space difference degree may be determined according to at least one of the subspace input difference degree, the attention matrix difference degree, and the subspace output difference degree. A manner for determining the space difference degree according to at least one of the subspace input difference degree, the attention matrix difference degree, and the subspace output difference degree may be customized. The determining manner may be customized as: determining one of the subspace input difference degree, the attention matrix difference degree, and the subspace output difference degree as the space difference degree of the neural network model. A larger subspace input difference degree, attention matrix difference degree, or subspace output difference degree reflects a larger difference between the subspaces in the neural network model, and a more accurate output of the neural network model. Alternatively, the determining manner may be customized by combining two of the subspace input difference degree, the attention matrix difference degree, and the subspace output difference degree, and determining a combination result as the space difference degree of the neural network model. Here, the manners for combining two of the subspace input difference degree, the attention matrix difference degree, and the subspace output difference degree include, but are not limited to, calculation manners such as summation, weighting, and averaging. Alternatively, the determining manner may be customized by combining the subspace input difference degree, the attention matrix difference degree, and the subspace output difference degree, and determining a combination result as the space difference degree of the neural network model. Manners for combining the subspace input difference degree, the attention matrix difference degree, and the subspace output difference degree include but are not limited to calculation manners such as summation, weighting, and averaging.

Step 602, step 604, and step 606 may be performed at the same time or arbitrarily, or performed in an order.

Figure 8:
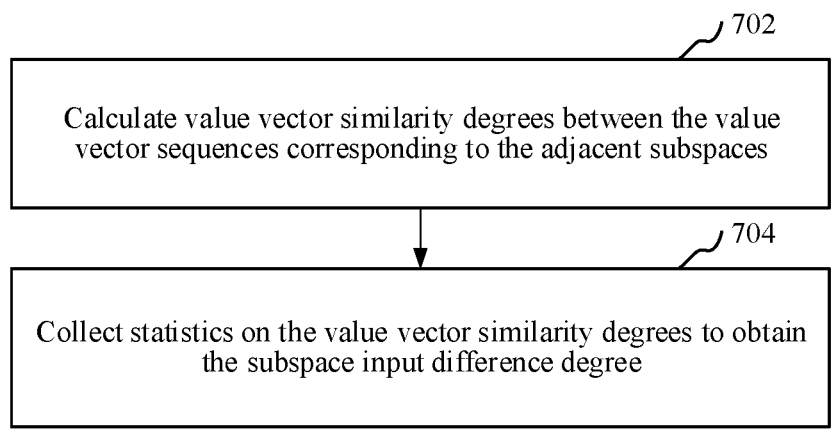
FIG. 8 is a schematic flowchart of a step of calculating a subspace input difference degree according to value vector sequences corresponding to adjacent subspaces according to an embodiment.

FIG. 8 is a schematic flowchart of a step of calculating a subspace input difference degree according to value vector sequences corresponding to adjacent subspaces according to an embodiment. Referring to FIG. 8, the calculating a subspace input difference degree according to value vector sequences corresponding to adjacent subspaces includes the following steps:

Step 702: Calculate value vector similarity degrees between the value vector sequences corresponding to the adjacent subspaces.

Step 704: Collect statistics on the value vector similarity degrees to obtain the subspace input difference degree.

Specifically, the value vector sequences corresponding to the adjacent subspaces of the neural network are obtained, and then the value vector similarity degrees between the value vector sequences corresponding to the adjacent subspaces are calculated. A manner for calculating the value vector similarity degrees between the value vector sequences corresponding to the adjacent subspaces may be customized. The calculation manner may be customized by: using a cosine similarity degree calculation manner, a Euclidean distance similarity degree calculation manner, a Manhattan distance similarity degree calculation manner, or the like. After the value vector similarity degrees between the value vector sequences corresponding to the adjacent subspaces in the neural network model are calculated, statistics collection is performed on the value vector similarity degrees to obtain the subspace input difference degree. A manner for collecting statistics on the value vector similarity degrees to obtain the subspace input difference degree may be customized. The statistics collection manner may be customized as but are not limited to calculation manners such as summation, weighted summation, averaging, and variance calculation.

In an embodiment, normalization and a dot product operation are first performed on the value vector sequences corresponding to the adjacent subspaces in the neural network model, to obtain cosine similarity degrees between the value vector sequences corresponding to the adjacent subspaces, which are represented by using cos(□). The cosine similarity degree measures a cosine value of an included angle between value vector sequences $V_i$ and $V_j$ that correspond to adjacent subspaces. Subsequently, a cosine distance is defined as a negative value of the cosine similarity degree, which is −cos(□). Finally, a sum of the cosine similarity degrees between the value vector sequences corresponding to the adjacent subspaces in the neural network model is used as the subspace input difference degree. Specifically, the subspace input difference degree may be calculated according to the following formula:

$$D_{subspace} = -\sum_{i=1}^{h-1} \sum_{j=i+1}^{h} \cos(V_i, V_j). \tag{17}$$

Here, $D_{subspace}$ represents the subspace input difference degree, $V_i$ and $V_j$ respectively represent value vector sequences of an $i^{th}$ subspace and a $j^{th}$ subspace, and h represents that there are h subspaces in total in the neural network model.

Figure 9:
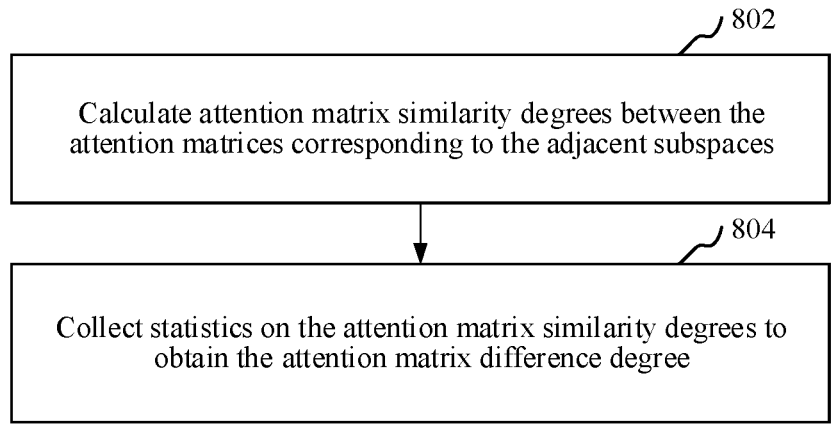
FIG. 9 is a schematic flowchart of a step of calculating an attention matrix difference degree according to attention matrices corresponding to adjacent subspaces according to an embodiment.

FIG. 9 is a schematic flowchart of a step of calculating an attention matrix difference degree according to attention matrices corresponding to adjacent subspaces according to an embodiment. As shown in FIG. 9, the calculating an attention matrix difference degree according to attention matrices corresponding to adjacent subspaces includes the following steps:

Step 802: Calculate attention matrix similarity degrees between the attention matrices corresponding to the adjacent subspaces.

Step 804: Collect statistics on the attention matrix similarity degrees to obtain the attention matrix difference degree.

Specifically, the attention matrices corresponding to the adjacent subspaces of the neural network are obtained, and then the attention matrix similarity degrees between the attention matrices corresponding to the adjacent subspaces are calculated. A manner for calculating the attention matrix similarity degrees between the attention matrices corresponding to the adjacent subspaces may be customized. The calculation manner may be customized by: a calculation manner in which the attention matrices corresponding to the adjacent subspaces are multiplied according to an element matrix, or using a cosine similarity degree calculation manner, a Euclidean distance similarity degree calculation manner, a Manhattan distance similarity degree calculation manner, or the like. After the attention matrix similarity degrees between the attention matrices corresponding to the adjacent subspaces in the neural network model are calculated, statistics collection is performed on the attention matrix similarity degrees to obtain the attention matrix difference degree. A manner for collecting statistics on the attention matrix similarity degrees to obtain the attention matrix difference degree may be customized. The statistics collection manner may be customized as, but are not limited to, calculation manners such as summation, weighted summation, averaging, and variance calculation.

In an embodiment, similarity degrees between the attention matrices of the adjacent subspaces are calculated by multiplying the attention matrices corresponding to the adjacent subspaces in the neural network model according to an element matrix, and a sum of the similarity degrees between the attention matrices of the adjacent subspaces may be used as the attention matrix difference degree. Specifically, the attention matrix difference degree may be calculated according to the following formula:

$$D_{position} = -\sum_{i=1}^{h-1}\sum_{j=i+1}^{h} A_i \times A_j. \tag{18}$$

Here, $D_{position}$ represents the attention matrix difference degree, $A_i$ and $A_j$ respectively represent attention matrices of an $i^{th}$ subspace and a $j^{th}$ subspace, and h represents that there are h subspaces in total in the neural network model.

Figure 10:
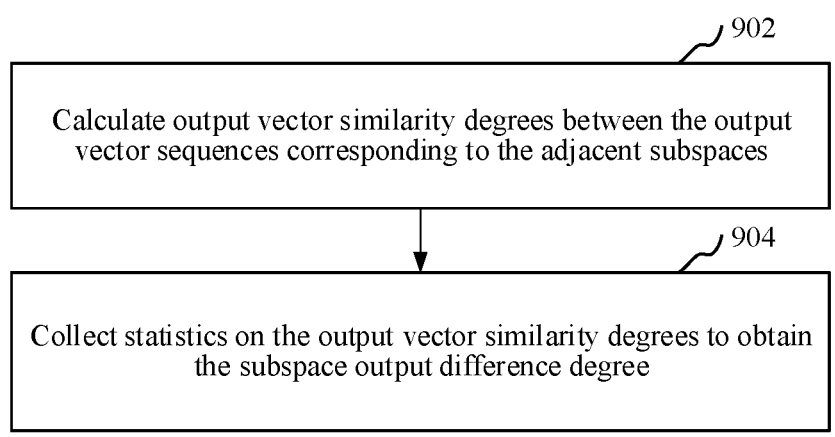
FIG. 10 is a schematic flowchart of a step of calculating a subspace output difference degree according to output vector sequences corresponding to adjacent subspaces according to an embodiment.

FIG. 10 is a schematic flowchart of a step of calculating a subspace output difference degree according to output vector sequences corresponding to adjacent subspaces according to an embodiment. As shown in FIG. 10, the calculating the subspace output difference degree according to output vector sequences corresponding to adjacent subspaces includes the following steps:

Step 902: Calculate output vector similarity degrees between the output vector sequences corresponding to the adjacent subspaces.

Step 904: Collect statistics on the output vector similarity degrees to obtain the subspace output difference degree.

Specifically, the output vector sequences corresponding to the adjacent subspaces of the neural network are obtained, and then the output vector similarity degrees between the output vector sequences corresponding to the adjacent subspaces are calculated. A manner for calculating the output vector similarity degrees between the output vector sequences corresponding to the adjacent subspaces may be customized. The calculation manner may be customized by using a cosine similarity degree calculation manner, a Euclidean distance similarity degree calculation manner, a Manhattan distance similarity degree calculation manner, or the like. After the output vector similarity degrees between the output vector sequences corresponding to the adjacent subspaces in the neural network model are calculated, statistics collection is performed on the output vector similarity degrees to obtain the subspace output difference degree. A manner for collecting statistics on the output vector similarity degrees to obtain the subspace output difference degree may be customized. The statistics collection manner may be customized as, but are not limited to, calculation manners such as summation, weighted summation, averaging, and variance calculation.

In an embodiment, normalization and a dot product operation are performed on the output vector sequences corresponding to the adjacent subspaces in the neural network model to obtain cosine similarity degrees between the output vector sequences corresponding to the adjacent subspaces, which are represented by using cos(□). The cosine similarity degree represents a cosine value of an included angle between output vector sequences $O_i$ and $O_j$ that correspond to adjacent subspaces. Subsequently, a cosine distance is defined as a negative value of the cosine similarity degree, which is −cos(□). Finally, a sum of the cosine similarity degrees between the output vector sequences corresponding to the adjacent subspaces in the neural network model is used as the subspace output difference degree. Specifically, the subspace output difference degree may be calculated according to the following formula:

$$D_{output} = -\sum_{i=1}^{h-1}\sum_{j=i+1}^{h} \cos(O_i \times O_j). \tag{19}$$

Here, $D_{output}$ represents the subspace output difference degree, $O_i$ and $O_j$ respectively represent output vector sequences of an $i^{th}$ subspace and a $j^{th}$ subspace, and h represents that there are h subspaces in total in the neural network model.

Figure 11:
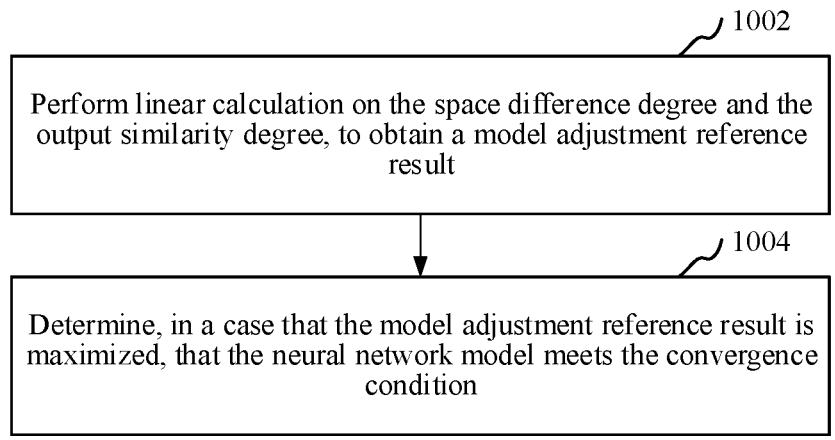
FIG. 11 is a schematic flowchart of training steps of a neural network model according to an embodiment.

FIG. 11 is a schematic flowchart of training steps of a neural network model according to an embodiment. As shown in FIG. 11, the adjusting of a model parameter of the neural network model according to the space difference degree and the output similarity degree until a convergence condition is satisfied to obtain a target neural network model includes the following steps:

Step 1002: Perform linear calculation on the space difference degree and the output similarity degree to obtain a model adjustment reference result.

Step 1004: Determine, in a case that the model adjustment reference result is maximized, that the neural network model satisfies the convergence condition.

Specifically, after the space difference degree and the output similarity degree are calculated, the model parameter of the neural network model is adjusted according to the space difference degree and the output similarity degree. Specifically, linear calculation may be performed on the space difference degree and the output similarity degree, to obtain a model adjustment reference result. When the model adjustment reference result is maximized, it is considered that the neural network model meets the convergence condition. When the neural network model meets the convergence condition, it may be considered that the neural network model is a well-trained neural network model. Output accuracy of a well-trained neural network model is higher than that of an untrained neural network model. The convergence condition may be predetermined according to user's needs, and it is not limited to maximum value calculation, and the like.

In an embodiment, the performing linear calculation on the space difference degree and the output similarity degree to obtain a model adjustment reference result, and the determining, in a case that the model adjustment reference result is maximized, that the neural network model meets the convergence condition may specifically be performed according to the following formula:

$$J = \arg\max\{L+D\} \qquad (20).$$

Here, J represents the model adjustment reference result, arg max represents arguments of the maxima in which the model adjustment reference result is maximized, L represents the output similarity degree, and D represents the space difference degree.

In an embodiment, the neural network model is a machine translation model, and includes an encoding attention unit, a codec attention unit, and a decoding attention unit. The encoding attention unit, the codec attention unit, and the decoding attention unit, each includes a plurality of attention networks, and the codec attention unit may be separately connected to the encoding attention unit and the decoding attention unit.

The machine translation model translates to-be-translated content into a corresponding translated text. For example, when the to-be-translated content is Chinese, the machine translation model may translate it into corresponding English. The machine translation model may be an NMT model.

Figure 12:
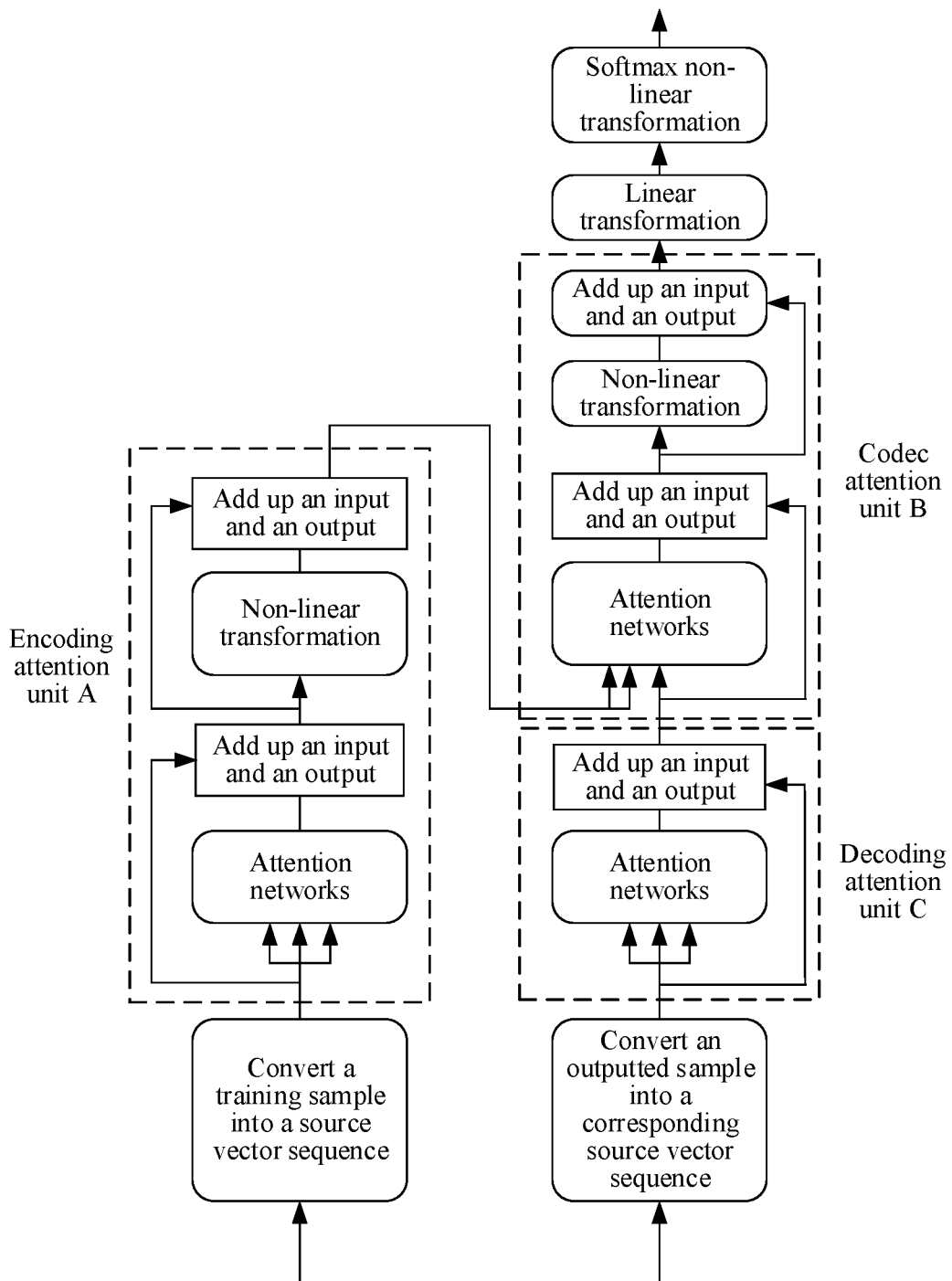
FIG. 12 is a schematic framework diagram of a neural network model according to an embodiment.

FIG. 12 is a schematic framework diagram of a neural network model according to an embodiment. The neural network model includes an encoding attention unit A, a codec attention unit B, and a decoding attention unit C. The encoding attention unit A, the codec attention unit B, and the decoding attention unit C each include a plurality of attention networks, and the codec attention unit B is separately connected to the encoding attention unit A and the decoding attention unit C. The encoding attention unit A is configured to calculate a dependency in a training sample. For example, if the training sample is "今天天气很好", the encoding attention unit A calculates dependencies between words in the training sample, such as a dependency between "今" and each of "天","气","很", and "好". Similarly, the decoding attention unit C is configured to calculate a dependency in an outputted text corresponding to a training sample. For example, the training sample is "今天是星期一", and the corresponding outputted text is "Today is Monday". Then the decoding attention unit C calculates dependencies between words in the outputted text, such as a dependency between "Today" and each of "is" and "Monday". The codec attention unit B is configured to calculate a dependency between a training sample and an outputted text. For example, the training sample is "今天是星期一", and the corresponding outputted text is: "Today is Monday". Then the codec attention unit B calculates a dependency between each word in the training sample and each word in the outputted text, such as a dependency between "今" and each of "Today", "is", and "Monday".

An output of the encoding attention unit A may be used as an input of the codec attention unit B, and an output of the decoding attention unit C may also be simultaneously used as an input of the codec attention unit B. Linear transformation and non-linear transformation may be further performed on an output of the codec attention unit B, and finally an output result of the neural network model is obtained. When model training is performed on an NMT model, an encoding attention unit, a codec attention unit, and a decoding attention unit are simultaneously trained. When a sum of space difference degrees of the encoding attention unit, the codec attention unit, and the decoding attention unit is maximized, it can be considered that the NMT model meets a convergence condition, and a target neural network model is obtained.

In an embodiment, the training sample is at least one of a to-be-translated text, a to-be-translated video, and a to-be-translated audio, and the standard label corresponding to the training sample is a standard translated text.

If the training sample is a to-be-translated text, the standard label corresponding to the training sample is a standard translated text. In an embodiment, if the to-be-translated text is Chinese, the standard label corresponding to the training sample is a standard translated text in English. For example, if the to-be-translated text is "我爱你" in Chinese, a standard label corresponding to the training sample is "I love you". In other words, "I love you" is a standard translated text corresponding to the to-be-translated text. In an embodiment, if the to-be-translated text is English, the standard label corresponding to the training sample is a standard translated text in Chinese. For example, if the to-be-translated text is "I have an apple" in English, a standard label corresponding to the training sample is "我有一个苹果". In other words, "我有一个苹果" is a standard translated text corresponding to the to-be-translated text. In an embodiment, if the training sample is a to-be-translated video, the neural network training method may be applied in an image annotation application scenario. In the image annotation application scenario, a standard label corresponding to the training sample is also a standard translated text. The standard translated text herein is used for describing content presented in a scene of the to-be-translated video. For example, the scene of the to-be-translated video is a scene in which a teacher is giving a lesson to students. Then a standard label corresponding to the training sample is "老师在教室里上课". The to-be-translated video may be a static video frame or a dynamic video frame.

In an embodiment, if the training sample is a to-be-translated audio, a standard label corresponding to the training sample is a standard translated text. The standard translated text is used for describing content played in the to-be-translated audio. For example, the to-be-translated audio is a few words: "我很好谢谢". Then a standard label corresponding to the training sample is "我很好谢谢" or "I am fine, thank you".

In a specific embodiment, a neural network training method is provided. The method specifically includes the following steps:

Step 1102: Obtain a training sample set, each training sample in the training sample set having a corresponding standard label. The training sample may be at least one of a to-be-translated text, a to-be-translated video, and a to-be-translated audio. The standard label corresponding to the training sample is a standard translated text.

Step 1104: Input the each training sample in the training sample set into a neural network model, the neural network model including a plurality of attention networks, the plurality of attention networks respectively mapping the each training sample to a plurality of different subspaces, each of the subspaces including a corresponding query vector sequence, a corresponding key vector sequence, and a corresponding value vector sequence. The neural network model is a machine translation model, and includes an encoding attention unit, a codec attention unit, and a decoding attention unit. The encoding attention unit, the codec attention unit, and the decoding attention unit each includes a plurality of attention networks, and the codec attention unit may be separately connected to the encoding attention unit and the decoding attention unit.

Step 1104a: Convert the each training sample into a corresponding source vector sequence.

Step 1104b: Obtain a query parameter matrix, a key parameter matrix, and a value parameter matrix, and respectively perform linear transformation on the source vector sequence according to the query parameter matrix, the key parameter matrix, and the value parameter matrix, to obtain a corresponding basic query vector sequence, a corresponding basic key vector sequence, and a corresponding basic value vector sequence.

Step 1104c: Obtain a space parameter matrix corresponding to the each subspace, and respectively perform linear mapping on the basic query vector sequence, the basic key vector sequence, and the basic value vector sequence according to the space parameter matrix, to obtain a query vector sequence, a key vector sequence, and a value vector sequence that correspond to the each subspace.

Step 1106: Calculate a logical similarity degree between a query vector sequence and a key vector sequence in a current subspace.

Step 1108: Obtain an attention matrix corresponding to the current subspace through calculation according to the logical similarity degree.

Step 1110: Obtain an output vector sequence corresponding to the current subspace through calculation according to the attention matrix and a value vector sequence.

Step 1112: Splice output vector sequences corresponding to the subspaces, and then perform linear transformation on a spliced output vector sequence, to obtain an outputted network representation sequence.

Step 1114: Use the network representation sequence as an updated source vector sequence, return to the operation of obtaining a query parameter matrix, a key parameter matrix, and a value parameter matrix and respectively performing linear transformation on the source vector sequence according to the query parameter matrix, the key parameter matrix, and the value parameter matrix, and output a target network representation sequence in a case that a cycle stop condition is met.

Step 1116: Calculate a space difference degree between the subspaces by using the neural network model. This step includes sub-steps 1116a, and/or 1116b, and/or 1116c; and 1116d.

Step 1116a: Calculate a subspace input difference degree according to value vector sequences corresponding to adjacent subspaces. This step includes step 1116aa and step 1116ab.

Step 1116aa: Calculate value vector similarity degrees between the value vector sequences corresponding to the adjacent subspaces.

Step 1116ab: Collect statistics on the value vector similarity degrees to obtain the subspace input difference degree.

Step 1116b: Calculate an attention matrix difference degree according to attention matrices corresponding to adjacent subspaces. This step includes sub-step 1116ba and sub-step 1116bb.

Step 1116ba: Calculate attention matrix similarity degrees between the attention matrices corresponding to the adjacent subspaces.

Step 1116bb: Collect statistics on the attention matrix similarity degrees to obtain the attention matrix difference degree.

Step 1116c: Calculate a subspace output difference degree according to output vector sequences corresponding to adjacent subspaces. This step includes sub-step 1116ca and sub-step 1116cb.

Step 1116ca: Calculate output vector similarity degrees between the output vector sequences corresponding to the adjacent subspaces.

Step 1116cb: Collect statistics on the output vector similarity degrees to obtain the subspace output difference degree.

Step 1116d: Determine the space difference degree according to at least one of the subspace input difference degree, the attention matrix difference degree, and the subspace output difference degree.

Step 1118: Calculate an output similarity degree according to an output of the neural network model and the standard label corresponding to the each training sample.

Step 1120: Adjust a model parameter of the neural network model according to the space difference degree and the output similarity degree until a convergence condition is met, to obtain a target neural network model. This step includes sub-step 1120a and sub-step 1120b.

Step 1120a: Perform linear calculation on the space difference degree and the output similarity degree, to obtain a model adjustment reference result.

Step 1120b: Determine, in a case that the model adjustment reference result is maximized, that the neural network model meets the convergence condition.

It is to be understood that although the steps in the flowchart are shown according to indication of an arrow, the steps are not necessarily performed according to a sequence indicated by the arrow. Unless explicitly indicated, the sequence for performing the steps is not strictly limited, and the steps may be performed in other sequences. Besides, at least some steps in the flowchart may include a plurality of sub-steps or a plurality of stages, the sub-steps or stages are not necessarily performed at the same moment and may be performed at different moments, the sub-steps or stages are not necessarily sequentially performed, but may be performed in turn or alternately with other steps or at least some sub-steps or stages of other steps.

Figure 13:
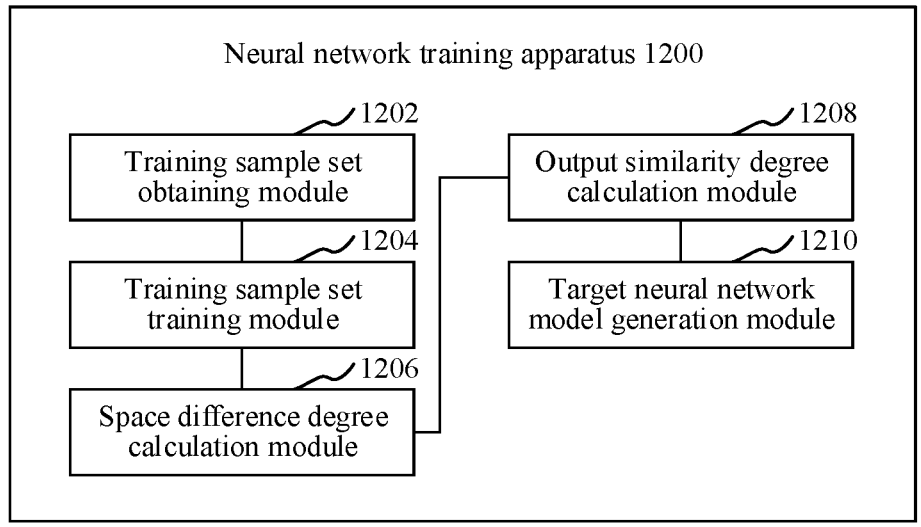
FIG. 13 is a structural block diagram of a neural network training apparatus according to an embodiment.

As shown in FIG. 13, in an embodiment, a neural network training apparatus 1200 is provided. The neural network training apparatus 1200 includes: a training sample set obtaining module 1202 configured to obtain a training sample set, each training sample in the training sample set having a corresponding standard label; a training sample set training module 1204 configured to input the each training sample in the training sample set into a neural network model, the neural network model including n attention networks, the n attention networks respectively mapping the each training sample to n different subspaces, each of the subspaces including a corresponding query vector sequence, a corresponding key vector sequence, and a corresponding value vector sequence, and n being an integer greater than 1; a space difference degree calculation module 1206 configured to calculate a space difference degree between the subspaces by using the neural network model; an output similarity degree calculation module 1208 configured to calculate an output similarity degree according to an output of the neural network model and the standard label corresponding to the each training sample; and a target neural network model generation module 1210 configured to adjust a model parameter of the neural network model according to the space difference degree and the output similarity degree until a convergence condition is met, to obtain a target neural network model.

Figure 14:
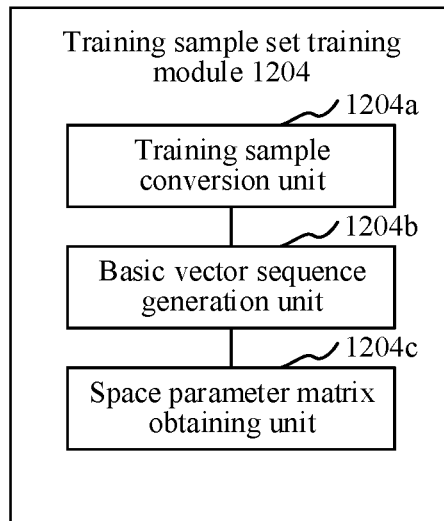
FIG. 14 is a structural block diagram of a training sample set training module according to an embodiment.

In an embodiment, as shown in FIG. 14, the training sample set training module 1204 includes: a training sample conversion unit 1204a configured to convert the each training sample into a corresponding source vector sequence; a basic vector sequence generation unit 1204b configured to: obtain a query parameter matrix, a key parameter matrix, and a value parameter matrix, and respectively perform linear transformation on the source vector sequence according to the query parameter matrix, the key parameter matrix, and the value parameter matrix, to obtain a corresponding basic query vector sequence, a corresponding basic key vector sequence, and a corresponding basic value vector sequence; and a space parameter matrix obtaining unit 1204c configured to: obtain a space parameter matrix corresponding to the each subspace, and respectively perform linear mapping on the basic query vector sequence, the basic key vector sequence, and the basic value vector sequence according to the space parameter matrix, to obtain the query vector sequence, the key vector sequence, and the value vector sequence that correspond to the each subspace.

In an embodiment, the neural network training apparatus 1200 further includes a splicing unit and an iteration unit. The splicing unit is configured to splice output vector sequences corresponding to the subspaces, and then perform linear transformation on a sliced output vector sequence to obtain an outputted network representation sequence. The iteration unit is configured to use the network representation sequence as an updated source vector sequence, and return to the operation of obtaining a query parameter matrix, a key parameter matrix, and a value parameter matrix and respectively performing linear transformation on the source vector sequence according to the query parameter matrix, the key parameter matrix, and the value parameter matrix; and output a target network representation sequence in a case that a cycle stop condition is met.

Figure 15:
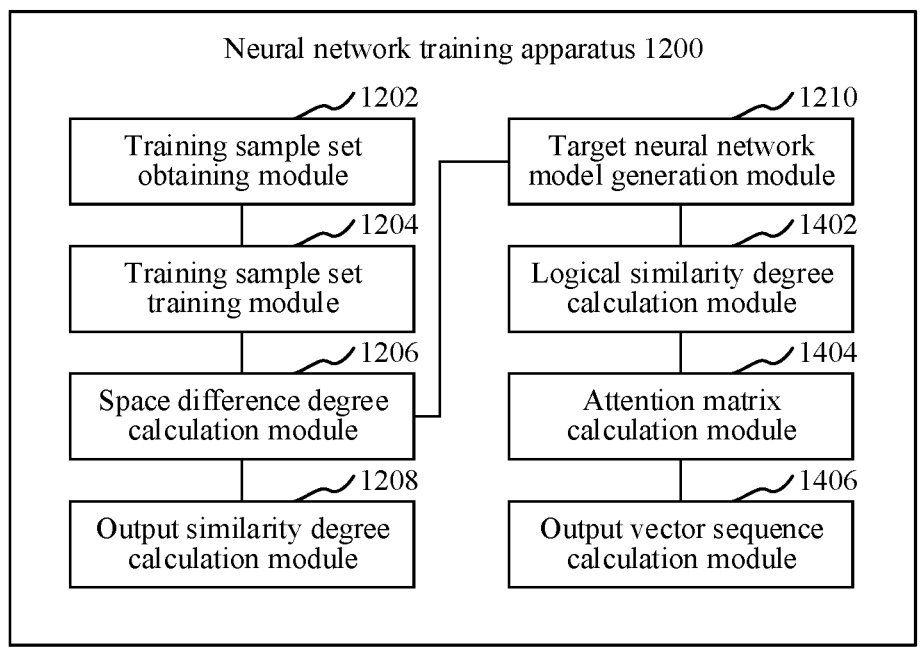
FIG. 15 is a structural block diagram of a neural network training apparatus according to another embodiment.

In an embodiment, as shown in FIG. 15, the neural network training apparatus 1200 further includes: a logical similarity degree calculation module 1402 configured to calculate a logical similarity degree between a query vector sequence and a key vector sequence in a current subspace; an attention matrix calculation module 1404 configured to obtain an attention matrix corresponding to the current subspace through calculation according to the logical similarity degree; and an output vector sequence calculation module 1406 configured to obtain an output vector sequence corresponding to the current subspace through calculation according to the attention matrix and a value vector sequence.

In an embodiment, the space difference degree calculation module 1206 is further configured to: calculate a subspace input difference degree according to value vector sequences corresponding to adjacent subspaces; and/or calculate an attention matrix difference degree according to attention matrices corresponding to adjacent subspaces; and/or calculate a subspace output difference degree according to output vector sequences corresponding to adjacent subspaces; and determine the space difference degree according to at least one of the subspace input difference degree, the attention matrix difference degree, and the subspace output difference degree.

In an embodiment, the space difference degree calculation module 1206 is further configured to: calculate value vector similarity degrees between the value vector sequences corresponding to the adjacent subspaces; and collect statistics on the value vector similarity degrees to obtain the subspace input difference degree.

In an embodiment, the space difference degree calculation module 1206 is further configured to: calculate attention matrix similarity degrees between the attention matrices corresponding to the adjacent subspaces; and collect statistics on the attention matrix similarity degrees to obtain the attention matrix difference degree.

In an embodiment, the space difference degree calculation module 1206 is further configured to: calculate output vector similarity degrees between the output vector sequences corresponding to the adjacent subspaces; and collect statistics on the output vector similarity degrees to obtain the subspace output difference degree.

In an embodiment, the target neural network model generation module 1210 is further configured to: perform linear calculation on the space difference degree and the output similarity degree, to obtain a model adjustment reference result; and determine, in a case that the model adjustment reference result is maximized, that the neural network model meets the convergence condition, and the target neural network model is obtained.

In an embodiment, the neural network model is a machine translation model, and includes an encoding attention unit, a codec attention unit, and a decoding attention unit, the encoding attention unit, the codec attention unit, and the decoding attention unit each including a plurality of attention networks, and the codec attention unit being separately connected to the encoding attention unit and the decoding attention unit.

In an embodiment, the training sample may be at least one of a to-be-translated text, a to-be-translated video, or a to-be-translated audio, and the standard label corresponding to the training sample may be a standard translated text.

Figure 16:
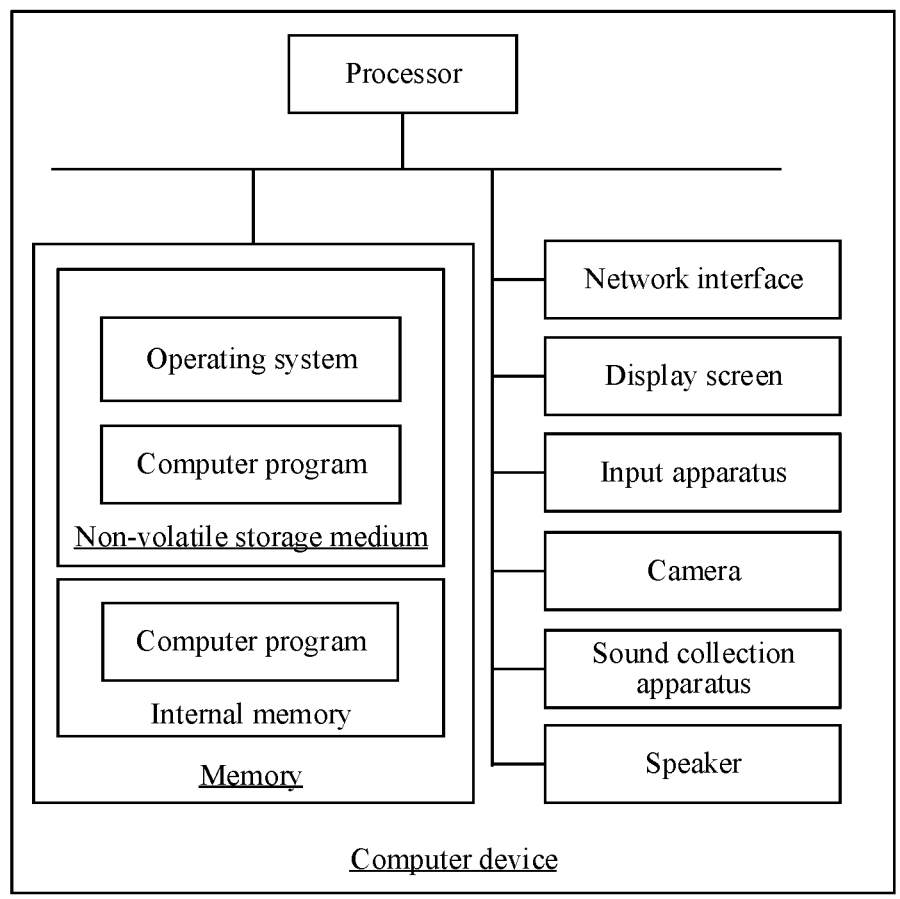
FIG. 16 is a structural block diagram of a computer device according to an embodiment.

FIG. 16 is a diagram of an internal structure of a computer device according to an embodiment. The computer device may be specifically the terminal 110 or the server 120 in FIG. 1. As shown in FIG. 16, the computer device includes a processor, a memory, a network interface, an input apparatus, and a display screen that are connected by using a system bus. The memory includes a non-volatile storage medium and an internal memory. The non-volatile storage medium of the computer device stores an operating system and may further store a computer program, the computer program, when executed by the processor, causing the processor to implement a neural network training method. The internal memory may also store a computer program, the computer program, when executed by the processor, causing the processor to perform the neural network training method. The display screen of the computer device may be a liquid crystal display screen or an e-ink display screen. The input apparatus of the computer device may be a touch layer covering the display screen, or may be a button, a trackball, or a touchpad disposed on a housing of the computer device, or may be an external keyboard, touchpad, mouse, or the like.

A person skilled in the art may understand that, the structure shown in FIG. 16 is only an example block diagram of a partial structure, and is not intended to limit the computer device to which the solution of the disclosure is applied. Specifically, the specific computer device may include more or fewer components than those shown in the figure, or some components may be combined, or a different component may be used.

In an embodiment, a neural network training apparatus may be implemented in a form of a computer program, and the computer program may be run on the computer device shown in FIG. 16. The memory of the computer device may store program modules or code forming the neural network training apparatus, for example, the training sample set obtaining module, the training sample set training module, the space difference degree calculation module, the output similarity degree calculation module, and the target neural network model generation module shown in FIG. 13. The computer program formed by the program modules causes the processor to perform steps in the neural network training method according to the embodiments described in the disclosure.

For example, the computer device shown in FIG. 16 may use the training sample set obtaining module in the neural network training apparatus shown in FIG. 13 to obtain a training sample set, each training sample in the training sample set having a corresponding standard label; use the training sample set training module to input the each training sample in the training sample set into a neural network model, the neural network model including a plurality of attention networks, the plurality of attention networks respectively mapping the each training sample to a plurality of different subspaces, each of the subspaces including a corresponding query vector sequence, a corresponding key vector sequence, and a corresponding value vector sequence; use the space difference degree calculation module to calculate a space difference degree between the subspaces by using the neural network model; use the output similarity degree calculation module to calculate an output similarity degree according to an output of the neural network model and the standard label corresponding to the each training sample, and use the target neural network model generation module to adjust a model parameter of the neural network model according to the space difference degree and the output similarity degree until a convergence condition is met, to obtain a target neural network model.

In an embodiment, a computer device is provided, including a memory and a processor. The memory stores a computer program, the computer program, when executed, causing the processor to perform the foregoing neural network training method, for example, perform the following steps: obtaining a training sample set, each training sample in the training sample set having a corresponding standard label; inputting the each training sample in the training sample set into a neural network model, the neural network model including a plurality of attention networks, the plurality of attention networks respectively mapping the each training sample to a plurality of different subspaces, each of the subspaces including a corresponding query vector sequence, a corresponding key vector sequence, and a corresponding value vector sequence; calculating a space difference degree between the subspaces by using the neural network model; calculating an output similarity degree according to an output of the neural network model and the standard label corresponding to the each training sample; and adjusting a model parameter of the neural network model according to the space difference degree and the output similarity degree until a convergence condition is satisfied, to obtain a target neural network model.

A person of ordinary skill in the art may understand that all or some of the processes of the methods in the foregoing embodiments may be implemented by a computer program instructing relevant hardware. The program may be stored in a non-volatile computer-readable storage medium. When the program is executed, the processes of the foregoing method embodiments may be implemented. Any reference to a memory, a storage, a database, or another medium used in the various embodiments provided in the disclosure may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash. The volatile memory may include a random access memory (RAM) or an external cache. For the purpose of description instead of limitation, the RAM is available in a plurality of forms, such as a static RAM (SRAM), a dynamic RAM (DRAM), a synchronous DRAM (SDRAM), a double data rate SDRAM (DDRS-DRAM), an enhanced SDRAM (ESDRAM), a synchlink DRAM (SLDRAM), a rambus direct RAM (RDRAM), a direct rambus dynamic RAM (DRDRAM), and a rambus dynamic RAM (RDRAM).

The technical features in the foregoing embodiments may be randomly combined. For concise description, not all possible combinations of the technical features in the foregoing embodiments are described. However, the combinations of the technical features are to be considered as falling within the scope recorded in the disclosure provided that they do not conflict with each other.

In addition, it may be understood that, the terms such as "first", "second" etc., may be used to describe various elements, and the elements should not be limited by these terms. These terms may be used only to distinguish one element from another element.

The foregoing embodiments show specific implementations of some example embodiments, but are not intended to limit the patent scope of the disclosure. A person of ordinary skill in the art may make modifications, substitutions and improvements without departing from the scope of the disclosure, and such modifications, substitutions and improvements shall all fall within the protection scope of the disclosure. Therefore, the protection scope of this disclosure is subject to the protection scope of the appended claims.

What is claimed is:

1. A neural network training method, performed by a computer device, the method comprising:
   obtaining a training sample set, each training sample in the training sample set including a corresponding standard label;
   training a neural network module based on inputting the each training sample in the training sample set into the neural network model, the neural network model comprising n attention networks, the n attention networks respectively mapping the each training sample to n different subspaces, each subspace of the n subspaces comprising a corresponding query vector sequence, a corresponding key vector sequence, and a corresponding value vector sequence, and n being an integer greater than 1;
   determining a space difference degree between the n subspaces by using the neural network model;
   determining an output similarity degree according to an output of the neural network model and the standard label corresponding to the each training sample; and
   retraining the neural network model by adjusting a model parameter of the neural network model according to the space difference degree and the output similarity degree until a convergence condition is satisfied, thereby obtaining a target neural network model based on retraining the neural network model by adjusting the model parameter.

2. The method according to claim 1, wherein the n attention networks respectively mapping the each training sample to the n different subspaces comprises:
   converting the each training sample into a corresponding source vector sequence;

obtaining a first query parameter matrix, a first key parameter matrix, and a first value parameter matrix, and respectively performing linear transformation on the corresponding source vector sequence according to the first query parameter matrix, the first key parameter matrix, and the first value parameter matrix, to obtain a corresponding basic query vector sequence, a corresponding basic key vector sequence, and a corresponding basic value vector sequence; and obtaining a space parameter matrix corresponding to the each subspace, and respectively performing linear mapping on the basic query vector sequence, the basic key vector sequence, and the basic value vector sequence according to the space parameter matrix, to obtain the query vector sequence, the key vector sequence, and the value vector sequence that correspond to the each subspace.

3. The method according to claim 2, further comprising:
splicing output vector sequences corresponding to the subspaces, and performing linear transformation on a spliced output vector sequence to obtain a network representation sequence; and using the network representation sequence as an updated source vector sequence to obtain a second query parameter matrix, a second key parameter matrix, and a second value parameter matrix and respectively performing linear transformation on the source vector sequence according to the second query parameter matrix, the second key parameter matrix, and the second value parameter matrix, and outputting a target network representation sequence based on determining that a cycle stop condition is satisfied.

4. The method according to claim 1, further comprising:
determining a logical similarity degree between a query vector sequence and a key vector sequence in a current subspace among the n subspaces;
obtaining an attention matrix corresponding to the current subspace through determination according to the logical similarity degree; and
obtaining an output vector sequence corresponding to the current subspace through determination according to the attention matrix and a value vector sequence.

5. The method according to claim 4, wherein the determining the space difference degree between the n subspaces by using the neural network model comprises:
determining a subspace input difference degree according to value vector sequences corresponding to adjacent subspaces among the n subspaces;
determining an attention matrix difference degree according to attention matrices corresponding to the adjacent subspaces;
determining a subspace output difference degree according to output vector sequences corresponding to the adjacent subspaces; and
determining the space difference degree according to at least one of the subspace input difference degree, the attention matrix difference degree, or the subspace output difference degree.

6. The method according to claim 5, wherein the determining subspace input difference degree according to the value vector sequences corresponding to the adjacent subspaces comprises:
determining value vector similarity degrees between the value vector sequences corresponding to the adjacent subspaces; and
collecting statistics on the value vector similarity degrees to obtain the subspace input difference degree.

7. The method according to claim 5, wherein the determining the attention matrix difference degree according to the attention matrices corresponding to the adjacent subspaces comprises:
determining attention matrix similarity degrees between the attention matrices corresponding to the adjacent subspaces; and
collecting statistics on the attention matrix similarity degrees to obtain the attention matrix difference degree.

8. The method according to claim 5, wherein the determining the subspace output difference degree according to the output vector sequences corresponding to the adjacent subspaces comprises:
determining output vector similarity degrees between the output vector sequences corresponding to the adjacent subspaces; and
collecting statistics on the output vector similarity degrees to obtain the subspace output difference degree.

9. The method according to claim 1, wherein the adjusting a model parameter of the neural network model according to the space difference degree and the output similarity degree until the convergence condition is satisfied comprises:
performing linear determination on the space difference degree and the output similarity degree to obtain a model adjustment reference result; and
based on the model adjustment reference result being maximized, determining that the neural network model satisfies the convergence condition.

10. The method according to claim 1, wherein the neural network model is a machine translation model, and comprises an encoding attention unit, a codec attention unit, and a decoding attention unit,
wherein each of the encoding attention unit, the codec attention unit, and the decoding attention unit comprises a plurality of attention networks, and
wherein the codec attention unit is separately connected to the encoding attention unit and the decoding attention unit.

11. The method according to claim 10, wherein the training sample is at least one of a text, a video, or an audio, and the standard label corresponding to the training sample is a standard translated text.

12. A neural network training apparatus, comprising:
at least one memory configured to store computer program code; and
at least one processor configured to access the at least one memory and operate as instructed by the computer program code, the computer program code comprising:
training sample set obtaining code configured to cause the at least one processor to obtain a training sample set, each training sample in the training sample set including a corresponding standard label;
training sample set training code configured to cause the at least one processor to train a neural network module based on inputting the each training sample in the training sample set into the neural network model, the neural network model comprising n attention networks, the n attention networks respectively mapping the each training sample to n different subspaces, each subspace of the n subspaces comprising a corresponding query vector sequence, a corresponding key vector sequence, and a corresponding value vector sequence, and n being an integer greater than 1;
space difference degree determination code configured to cause the at least one processor to determine a space difference degree between the n subspaces by using the neural network model;
output similarity degree determination code configured to cause the at least one processor to determine an output similarity degree according to an output of the neural network model and the standard label corresponding to the each training sample; and
target neural network model generation code configured to cause the at least one processor to retrain the neural network model by adjusting a model parameter of the neural network model according to the space difference degree and the output similarity degree until a convergence condition is satisfied, thereby obtaining a target neural network model based on retraining the neural network model by adjusting the model parameter.

13. The apparatus according to claim 12, wherein the training sample set training code further comprises:
training sample conversion code configured to cause the at least one processor to convert the each training sample into a corresponding source vector sequence;
basic vector sequence generation code configured to cause the at least one processor to obtain a first query parameter matrix, a first key parameter matrix, and a first value parameter matrix, and respectively perform linear transformation on the corresponding source vector sequence according to the first query parameter matrix, the first key parameter matrix, and the first value parameter matrix, to obtain a corresponding basic query vector sequence, a corresponding basic key vector sequence, and a corresponding basic value vector sequence; and
space parameter matrix obtaining code configured to cause the at least one processor to obtain a space parameter matrix corresponding to the each subspace, and respectively perform linear mapping on the basic query vector sequence, the basic key vector sequence, and the basic value vector sequence according to the space parameter matrix, to obtain the query vector sequence, the key vector sequence, and the value vector sequence that correspond to the each subspace.

14. The apparatus according to claim 13, further comprising:
splicing code configured to cause the at least one processor to splice output vector sequences corresponding to the subspaces, and perform linear transformation on a spliced output vector sequence to obtain a network representation sequence; and
iteration code configured to cause the at least one processor to use the network representation sequence as an updated source vector sequence to obtain a second query parameter matrix, a second key parameter matrix, and a second value parameter matrix and respectively perform linear transformation on the source vector sequence according to the second query parameter matrix, the second key parameter matrix, and the second value parameter matrix, and output a target network representation sequence based on determining that a cycle stop condition is satisfied.

15. The apparatus according to claim 12, further comprising:
logical similarity degree determination code configured to cause the at least one processor to determine a logical similarity degree between a query vector sequence and a key vector sequence in a current subspace among the n subspaces;

attention matrix determination code configured to cause the at least one processor to obtain an attention matrix corresponding to the current subspace through determination according to the logical similarity degree; and
output vector sequence determination code configured to cause the at least one processor to obtain an output vector sequence corresponding to the current subspace through determination according to the attention matrix and a value vector sequence.

16. The apparatus according to claim 15, wherein the space difference degree determination code is further configured to cause the at least one processor to:
determine a subspace input difference degree according to value vector sequences corresponding to adjacent subspaces among the n subspaces;
determine an attention matrix difference degree according to attention matrices corresponding to the adjacent subspaces;
determine a subspace output difference degree according to output vector sequences corresponding to the adjacent subspaces; and
determine the space difference degree according to at least one of the subspace input difference degree, the attention matrix difference degree, or the subspace output difference degree.

17. The apparatus according to claim 12, wherein the target neural network model generation code is further configured to cause the at least one processor to:
perform linear determination on the space difference degree and the output similarity degree to obtain a model adjustment reference result; and
based on the model adjustment reference result being maximized, determine that the neural network model satisfies the convergence condition.

18. The apparatus according to claim 12, wherein the neural network model is a machine translation model, and comprises an encoding attention unit, a codec attention unit, and a decoding attention unit,
wherein each of the encoding attention unit, the codec attention unit, and the decoding attention unit comprises a plurality of attention networks, and
wherein the codec attention unit is separately connected to the encoding attention unit and the decoding attention unit.

19. The apparatus according to claim 18, wherein the training sample is at least one of a text, a video, or an audio, and the standard label corresponding to the training sample is a standard translated text.

20. A non-transitory computer-readable storage medium storing computer program code to cause at least one processor to:
obtain a training sample set, each training sample in the training sample set including a corresponding standard label;
train a neural network module based on inputting the each training sample in the training sample set into the neural network model, the neural network model comprising n attention networks, the n attention networks respectively mapping the each training sample to n different subspaces, each subspace of the n subspaces comprising a corresponding query vector sequence, a corresponding key vector sequence, and a corresponding value vector sequence, and n being an integer greater than 1;
determine a space difference degree between the n subspaces by using the neural network model;

determine an output similarity degree according to an output of the neural network model and the standard label corresponding to the each training sample; and retrain the neural network model by adjusting a model parameter of the neural network model according to the space difference degree and the output similarity degree until a convergence condition is satisfied, thereby obtaining a target neural network model based on retraining the neural network model by adjusting the model parameter.

\* \* \* \* \*